(12) United States Patent
Salari

(10) Patent No.: US 11,416,889 B2
(45) Date of Patent: *Aug. 16, 2022

(54) APPARATUS, SYSTEM, AND METHOD FOR A MICRO COMMERCE AD

(71) Applicant: Soorena Salari, Alta Loma, CA (US)

(72) Inventor: Soorena Salari, Alta Loma, CA (US)

(*) Notice: Subject to any disclaimer, the term of this patent is extended or adjusted under 35 U.S.C. 154(b) by 61 days.

This patent is subject to a terminal disclaimer.

(21) Appl. No.: 16/181,291

(22) Filed: Nov. 5, 2018

(65) Prior Publication Data

US 2019/0073690 A1    Mar. 7, 2019

Related U.S. Application Data

(63) Continuation of application No. 13/326,140, filed on Dec. 14, 2011, now Pat. No. 10,121,163.

(Continued)

(51) Int. Cl.
  *G06Q 30/02*        (2012.01)
(52) U.S. Cl.
  CPC ..... *G06Q 30/0241* (2013.01); *G06Q 30/0277* (2013.01)
(58) Field of Classification Search
  CPC ................. G06Q 30/0241; G06Q 30/0277
  See application file for complete search history.

(56) References Cited

U.S. PATENT DOCUMENTS 6,016,504 A    1/2000  Arnold et al.
6,379,251 B1   4/2002  Auxier et al.

(Continued)

FOREIGN PATENT DOCUMENTS

CN    101558421 A    10/2009
JP    2003-331189    11/2003
          (Continued)

OTHER PUBLICATIONS

Shae, Zy., Wang, X. & von Kaenel, J. Transactional Multimedia Banner as Web Access Point. Electronic Commerce Research 1, 53-68 (2001). https://doi.org/10.1023/A:1011571528478 (Year: 2001).*

(Continued)

*Primary Examiner* — Eric W Stamber
*Assistant Examiner* — Alissa D Karmis
(74) *Attorney, Agent, or Firm* — Kunzler Bean & Adamson

(57) ABSTRACT

Apparatuses, methods, systems, and program products are disclosed for a micro commerce ad. An apparatus includes a processor and a memory that stores code executable by the processor. The code is executable by the processor to display an advertisement in a banner ad that is displayed in a banner ad slot of a publisher webpage. The advertisement includes an offering for a product and/or a service presented to a visitor and receivable by the visitor in response to the visitor providing feedback within the advertisement. The code is executable by the processor to receive the feedback from one or more input fields presented within the banner ad for receiving the contact information. The code is executable by the processor to provide the offering to the visitor within the banner ad in response to receiving the feedback from the visitor without redirecting the visitor away from the publisher webpage.

20 Claims, 20 Drawing Sheets

Related U.S. Application Data

(60) Provisional application No. 61/496,977, filed on Jun. 14, 2011, provisional application No. 61/422,943, filed on Dec. 14, 2010.

(56) References Cited

U.S. PATENT DOCUMENTS

| | | | |
|---|---|---|---|
| 6,490,601 B1 * | 12/2002 | Markus | G06F 21/6245 715/207 |
| 6,775,835 B1 | 8/2004 | Ahmad et al. | |
| 6,968,513 B1 | 11/2005 | Rinebold et al. | |
| 7,831,584 B2 | 11/2010 | Rothman | |
| 8,196,050 B2 | 6/2012 | Riley et al. | |
| 2001/0023407 A1 * | 9/2001 | Liyanearachchi | G06Q 30/02 705/14.25 |
| 2002/0103698 A1 * | 8/2002 | Cantrell | G06Q 30/02 705/14.55 |
| 2002/0112033 A1 | 8/2002 | Doemling et al. | |
| 2002/0188516 A1 | 12/2002 | Farrow et al. | |
| 2005/0160141 A1 | 7/2005 | Galley et al. | |
| 2006/0218036 A1 | 9/2006 | King et al. | |
| 2006/0258397 A1 | 11/2006 | Kaplan et al. | |
| 2006/0265507 A1 | 11/2006 | Banga et al. | |
| 2007/0083440 A1 * | 4/2007 | Wirtz | G06Q 30/06 705/14.51 |
| 2007/0217557 A1 * | 9/2007 | Schiff | G06F 21/41 375/354 |
| 2007/0265922 A1 | 11/2007 | Dumond et al. | |
| 2008/0162403 A1 | 7/2008 | Sundaresan | |
| 2008/0208761 A1 | 8/2008 | Autry et al. | |
| 2008/0282140 A1 | 11/2008 | Ioffe | |
| 2009/0037253 A1 | 2/2009 | Davidow et al. | |
| 2009/0077158 A1 | 3/2009 | Riley et al. | |
| 2009/0150239 A1 | 6/2009 | Dorman | |
| 2009/0164273 A1 | 6/2009 | Rothman | |
| 2009/0164315 A1 | 6/2009 | Rothman | |
| 2009/0164333 A1 | 6/2009 | Rothman | |
| 2009/0164338 A1 | 6/2009 | Rothman | |
| 2009/0164339 A1 | 6/2009 | Rothman | |
| 2009/0164383 A1 | 6/2009 | Rothman | |
| 2009/0281893 A1 | 11/2009 | Muhonen et al. | |
| 2010/0083143 A1 | 4/2010 | Bigley | |
| 2010/0095220 A1 | 4/2010 | Kassab | |
| 2010/0114739 A1 | 5/2010 | Johnston | |
| 2010/0287054 A1 | 11/2010 | Zohar et al. | |
| 2010/0293218 A1 | 11/2010 | Zhang et al. | |
| 2011/0085667 A1 | 4/2011 | Berrios et al. | |
| 2011/0099088 A1 | 4/2011 | Berrios et al. | |
| 2011/0213655 A1 | 9/2011 | Henkin et al. | |
| 2011/0218866 A1 | 9/2011 | Wilson | |
| 2011/0246290 A1 * | 10/2011 | Howard | G06Q 30/0277 715/764 |
| 2012/0095881 A1 | 4/2012 | Rothman | |

FOREIGN PATENT DOCUMENTS

| | | |
|---|---|---|
| JP | 2006251950 A | 9/2006 |
| KR | 10-2000-0037274 | 7/2000 |
| KR | 10-2001-0000680 | 1/2001 |
| WO | 2008-103395 A1 | 8/2008 |

OTHER PUBLICATIONS

Zon-Yin Shae: et al., "Transactional Multimedia Banner as Web Access Point", Electronic Commerce Research, Feb./Mar. 2001 (Year 2001) pp. 53-68.

Riley, Duncan, "Tailgate: Fully Transactional Web 2.0 Banners", Jul. 12, 2007, TechCrunch (Year: 2007) pp. 1-20.

* cited by examiner

APPARATUS, SYSTEM, AND METHOD FOR A MICRO COMMERCE AD

CROSS-REFERENCES TO RELATED APPLICATIONS

This application claims the benefit of U.S. Provisional Patent Application No. 61/422,943, filed on Dec. 14, 2010, and of U.S. Provisional Patent Application No. 61/496,977, filed on Jun. 14, 2011, and of U.S. patent application Ser. No. 13/326,140, filed on Dec. 14, 2011, which are incorporated herein by reference.

FIELD

The subject matter of the present disclosure relates to banner ads and more particularly relates to banner ads capable of performing a transaction.

BACKGROUND

Description of the Related Art

Internet banner ads are a popular method of advertising on the World Wide Web. Webpage publishers often leave slots open on the publishers web pages for the insertion of banner ads, typically, provided by an ad network that serves such banner ads or directly from an advertiser. These banner ads are often requested and inserted into a web page dynamically, as a visitor's browser loads the web page.

With conventional banner ads, a visitor, if interested in a product advertised in a banner ad, clicks on the banner ad, which typically redirects the visitor's current web page to a web page on the advertiser's e-commerce website.

SUMMARY

From the foregoing discussion, it should be apparent that a need exists for an apparatus, system, and methods for a micro-commerce ad. Beneficially, such an apparatus, system, and methods would perform a transaction within the banner ad.

The present subject matter has been developed in response to the present state of the art, and in particular, in response to the problems and needs in the art that have not yet been fully solved by currently available banner ads. Accordingly, the present subject matter has been developed to provide an apparatus, system, and methods for a micro commerce ad that overcome many or all of the above-discussed shortcomings in the art.

Apparatuses, methods, systems, and program products are presented for a micro commerce ad. An apparatus, in one embodiment, includes a processor and a memory that stores code executable by the processor. The code is executable by the processor, in certain embodiments, to display an advertisement in a banner ad that is displayed in a banner ad slot of a publisher webpage. The advertisement may include an offering for a product and/or a service presented to a visitor and receivable by the visitor in response to the visitor providing feedback within the advertisement. In further embodiments, the code is executable by the processor to receive the feedback from one or more input fields presented within the banner ad for receiving the contact information. In some embodiments, the code is executable by the processor to provide the offering to the visitor within the banner ad in response to receiving the feedback from the visitor without redirecting the visitor away from the publisher webpage.

In one embodiment, the feedback comprises one or more of contact information and preference information for one or more products and services. In some embodiments, the preference information comprises visitor input associated with a selection of one or more products and services that the visitor prefers. In various embodiments, the visitor input comprises a selection of one or more categories and sub-categories of products and services.

In one embodiment, the one or more of products and services are associated with an advertiser for the advertisement and are selected according to products and services that are available from the advertiser. The visitor may select the one or more categories and sub-categories of the products and services from within the banner ad. In certain embodiments, the selected categories and sub-categories of products and services are selected on the advertiser's web site and stored in a visitor account associated with the advertiser.

In one embodiment, the visitor logs into the visitor account by providing credentials within the banner ad to access the visitor's preferences. In some embodiments, the visitor registers for a new visitor account within the banner ad. The visitor's selection of one or more categories and sub-categories of products and services may be associated with the visitor's account. In certain embodiments, the offering for the one or more of the product and the service presented to the visitor is selected based on previously stored preferences associated with the visitor's account.

In one embodiment, the previously stored preferences are based on a purchase history of the visitor at the advertiser. In further embodiments, the previously stored preferences are stored in a database and accessed based on a visitor identifier that is stored as a cookie associated with the visitor's browser. In certain embodiments, the code is further executable by the processor to receive real-time information from the advertiser for the offering for the one or more of the product and the service and dynamically update the banner ad information for the one or more of the product and the service based on the received information.

In various embodiments, the real-time information comprises price information, inventory information, description information, quantity information, and payment information. In certain embodiments, the banner ad further comprises a plurality of different panels that each represent a distinct display within the banner ad. The plurality of panels may include one or more of storefront panels, settings panels, sales information panels, and visitor registration panels, the visitor setting preferences within the settings panel.

A method, in one embodiment, includes displaying an advertisement in a banner ad that is configured to display in a banner ad slot of a publisher webpage. The advertisement may include an offering for one or more of a product and a service presented to a visitor of the publisher webpage and receivable by the visitor in response to the visitor providing feedback within the advertisement. The method, in further embodiments, includes receiving the feedback from one or more input fields presented within the banner ad for receiving the contact information. In some embodiments, the method includes providing the offering to the visitor within the banner ad in response to receiving the feedback from the visitor without redirecting the visitor away from the publisher webpage.

In some embodiments, the feedback comprises one or more of contact information and preference information for one or more products and services. The preference information may include visitor input associated with a selection of one or more products and services that the visitor prefers. The visitor input may include a selection of one or more categories and sub-categories of products and services.

In certain embodiments, the one or more of products and services are associated with an advertiser for the advertisement and are selected according to products and services that are available from the advertiser. The visitor may select the one or more categories and sub-categories of the products and services from within the banner ad. In further embodiments, the selected categories and sub-categories of products and services are selected on the advertiser's website and stored in a visitor account. The visitor may log into the visitor account by providing credentials within the banner ad to access the visitor's preferences. In one embodiment, the visitor registers for a new visitor account with the advertiser from within the banner ad. The visitor's selection of one or more categories and sub-categories of products and services associated with the visitor's account.

In one embodiment, a computer program product includes a computer readable storage medium storing computer usable program code executable to perform operations. In one embodiment, the code is executable to perform displaying an advertisement in a banner ad that is configured to display in a banner ad slot of a publisher webpage. The advertisement may include an offering for one or more of a product and a service presented to a visitor of the publisher webpage and receivable by the visitor in response to the visitor providing feedback within the advertisement.

The code, in some embodiments, is executable to perform receiving the feedback from one or more input fields presented within the banner ad for receiving the contact information and providing the offering to the visitor within the banner ad in response to receiving the feedback from the visitor without redirecting the visitor away from the publisher webpage.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the subject matter disclosed herein will be readily understood, a description of the subject matter will be rendered by reference to specific embodiments that are illustrated in the appended drawings. Understanding that these drawings depict only typical embodiments of the subject matter and are not therefore to be considered to be limiting of its scope, the present subject matter will be described and explained with additional specificity and detail through the use of the accompanying drawings, in which.

DETAILED DESCRIPTION

Figure 1:
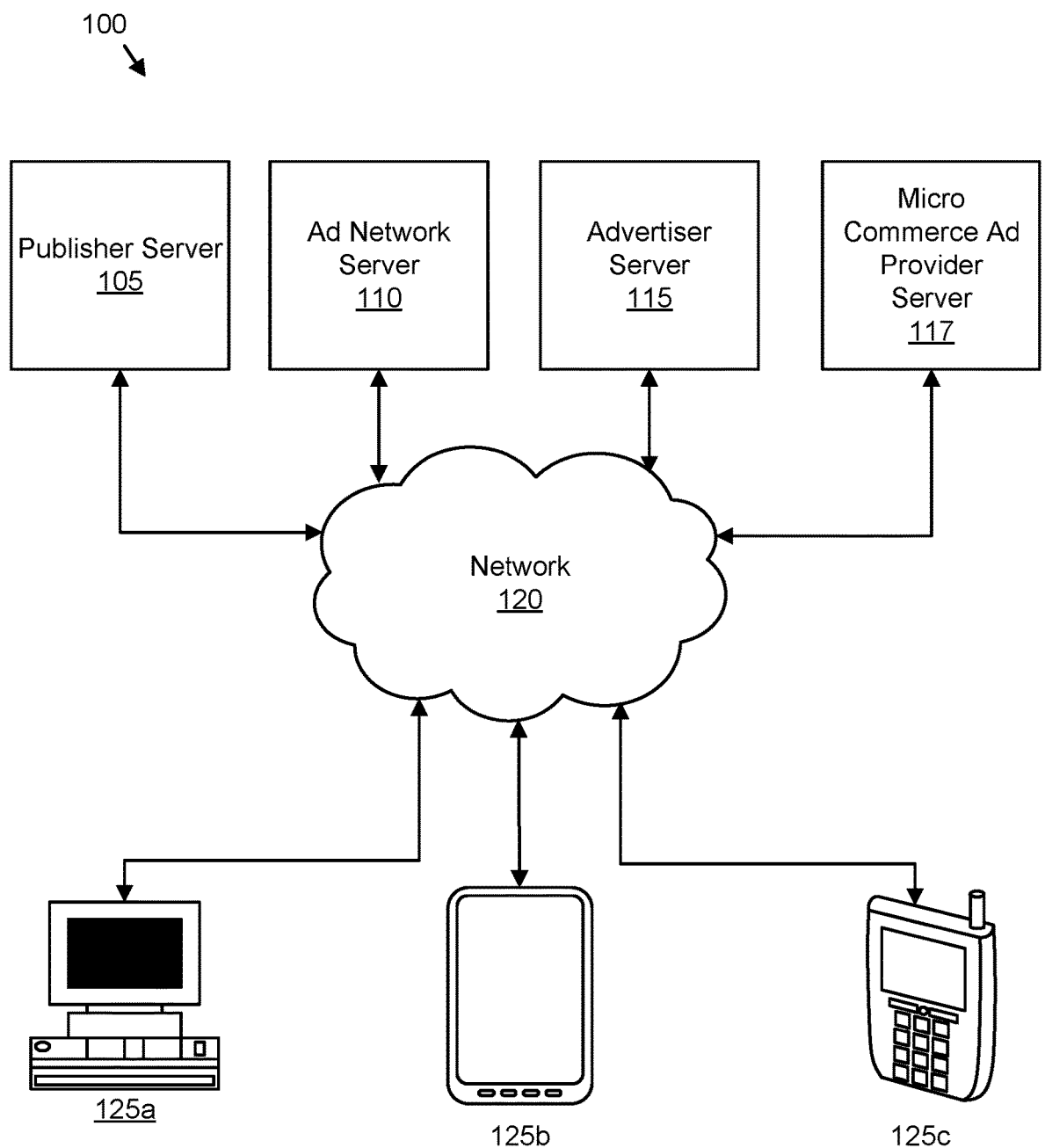
FIG. 1 is a schematic block diagram illustrating one embodiment of a system for a micro commerce ad in accordance with the present subject matter.

As will be appreciated by one skilled in the art, aspects of the present subject matter may be embodied as a system, method or computer program product. Accordingly, aspects of the present subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present subject matter may take the form of a computer program product embodied in one or more computer readable medium(s) having computer readable program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable mediums.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing.

More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present subject matter may be written in any combination of one or more programming languages, including an object oriented programming language such as Java, Smalltalk, C++ or the like, conventional procedural programming languages, such as the "C" programming language or similar programming languages, scripting languages such as Flash Action Script, PHP, JavaScript, Ruby and AJAX, and functional languages such Haskell and Lisp. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), a cloud computing network, or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment of the present subject matter. Thus, appearances of the phrases "in one embodiment," "in an embodiment," and similar language throughout this specification may, but do not necessarily, all refer to the same embodiment.

Furthermore, the described features, structures, or characteristics of the subject matter may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the subject matter. One skilled in the relevant art will recognize, however, that the subject matter may be practiced without one or more of the specific details, or with other methods, components, materials, and so forth. In other instances, well-known structures, materials, or operations are not shown or described in detail to avoid obscuring aspects of the subject matter.

Aspects of the present subject matter are described below with reference to schematic flowchart diagrams and/or schematic block diagrams of methods, apparatuses, systems, and computer program products according to embodiments of the subject matter. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present subject matter. In this regard, each block in the schematic flowchart diagrams and/or schematic block diagrams may represent a module, segment, or portion of code, which comprises one or more executable instructions for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer instructions.

All or a portion of the methods in the disclosed embodiments may be performed by and/or comprise a computer program product comprising a computer readable storage medium storing computer usable program code executable to perform operations comprising the methods.

FIG. 1 depicts one embodiment of a system 100 for a micro commerce ad. The system 100 includes publisher server 105, an ad network server 110, an advertiser server 115, a micro commerce ad provider server 117, a network 120, and a plurality of clients 125. The publisher server 105 may host, store, and/or provide one or more websites for access, and/or download over the network 120 by the plurality of clients 125 as is known in the art. The publisher server 105 may manage, control, and/or receive content from a publisher. As used herein, a publisher refers to an entity that publishes, provides, and/or otherwise makes a web site available. In one embodiment, the publisher may provide a website that includes one or more spaces or slots for a banner ad. In one embodiment, one or more publisher web pages from the publisher website include instructions (e.g. code) to cause the client 125a to request a banner ad to display in the banner ad slot.

The publisher server 105 may be embodied as a computing device such as a desktop computer, a portable computer, a server, a mainframe computer, and the like. The publisher server 105 may include memory storing computer readable programs. The publisher server 105 may include a processor that executes the computer readable programs as is well known to those skilled in the art. The computer readable programs may be tangibly stored in storage in communication with the electronic publication server. Although FIG. 1 depicts a single publisher server 105, one skilled in the art realizes that the system may include multiple publisher servers 105 and/or that the publisher server 105 may comprise a portion of a publisher platform hosting a plurality of websites.

The ad network server 110 may store, deliver, serve and/or provide banner ads (conventional banner ads and/or micro commerce ads in accordance with the present subject matter) for websites. In one embodiment, the ad network server 110 comprises an ad network proxy server that acts as an intermediary to provide ads from an advertiser server 115 to the clients 125a-c as the clients 125a-c load web pages from the publisher server 105. In one embodiment, the ad network server 110 stores banner ads obtained from the advertiser server 115 before the ad network server receives requests for banner ads. The ad network server 110 may be controlled, operated, and/or managed by a third party ad serving service or an ad network service.

The ad network server 110 may be embodied as a computing device including a desktop computer, a portable computer, a server, a mainframe computer, and the like. The ad network server 110 may include memory storing computer readable programs and a processor that executes the computer readable programs as is well known to those skilled in the art. Although FIG. 1 depicts a single ad network server 110, one skilled in the art realizes that the system may include multiple ad network servers 110.

The advertiser server 115 may create, store and/or provide banner ads (conventional banner ads and/or micro commerce ads) for websites directly and/or through the ad network server 110 for one or more shop owners. As used herein, a shop owner refers to a person and/or entity that sells goods and services. A shop owner may sell the goods and services online through banner ads, or may user banner ads to generally advertise the goods and services and/or to receive information from visitors, which may then be contacted subsequently. A shop owner may be a large entity such as a department store chain, a small entity, or the like. The advertiser server 115, in one embodiment, may be operated, managed, and/or controlled by a shop owner. In another embodiment, the advertiser server 115 creates, stores and/or provides banner ads for the shop owner.

The advertiser server 115 may be embodied as a computing device including a desktop computer, a portable computer, a server, a mainframe computer, and the like. The advertiser server 115 may include memory storing computer readable programs and a processor that executes the computer readable programs as is well known to those skilled in the art. Although FIG. 1 depicts a single advertiser server 115, one skilled in the art realizes that the system may include multiple advertiser servers 115.

The micro commerce ad provider server 117 is operated, managed, and/or controlled by a micro commerce ad provider. As used herein, the micro commerce ad provider is an entity that provides, manages, interfaces with, and/or otherwise makes micro commerce banner ads available to shop owners, to ad network servers, and/or the like. As used herein, a micro commerce ad is a banner ad according to the present subject matter. Specifically, as described below, a micro commerce ad may conform to banner ad market standards and perform a transaction in the banner ad as described herein. The micro commerce ad provider server 117, similar to the advertiser server 115 and the ad network server 110, may be embodied as a computing device. Likewise, the system 100, in other embodiments, may include multiple micro commerce ad servers 117.

A client 125a may communicate banner ad requests to the advertiser server 115 directly. Alternatively, the client 125a may communicate a request to the ad network server 110, which directs the request to the advertiser server 115 for a banner ad. The advertiser server 115 may also send banner ads to the ad network server 110 for the ad network server 110 to store to service banner ad requests.

The network 120 may comprise a global communications network such as the Internet, a Local Area Network (LAN), multiple LANs communicating over the Internet, or any other similar communications network. Each client 125 may be embodied as a desktop computer, a portable computer, a server, a mainframe computer, a handheld computing device, a touch device, a personal desktop assistant ("PDA"), a tablet computer, an e-Book reader, a mobile phone, a Smartphone, and the like. Each client 125 may communicate, using a software application such as an Internet browser, with the publisher server 105 to access, retrieve, and/or download webpages from one or more websites as is known in the art. As used herein, a visitor includes a person that accesses and/or views webpages using a client 125. A client 125a may load a webpage provided by the publisher server 105. The webpage may have a banner ad slot that includes instructions to cause the client 125a (e.g. the browser) to send a request to the ad network server 110 or to the advertiser server 115 for a banner ad. As the webpage is loaded by the client 125a, the client 125a executes the instructions and sends the request for the banner ad. The banner ad may then be sent by the ad network server 110 of the advertiser server 115 to the client 125a for display in the banner ad slot of the webpage.

Figure 2:
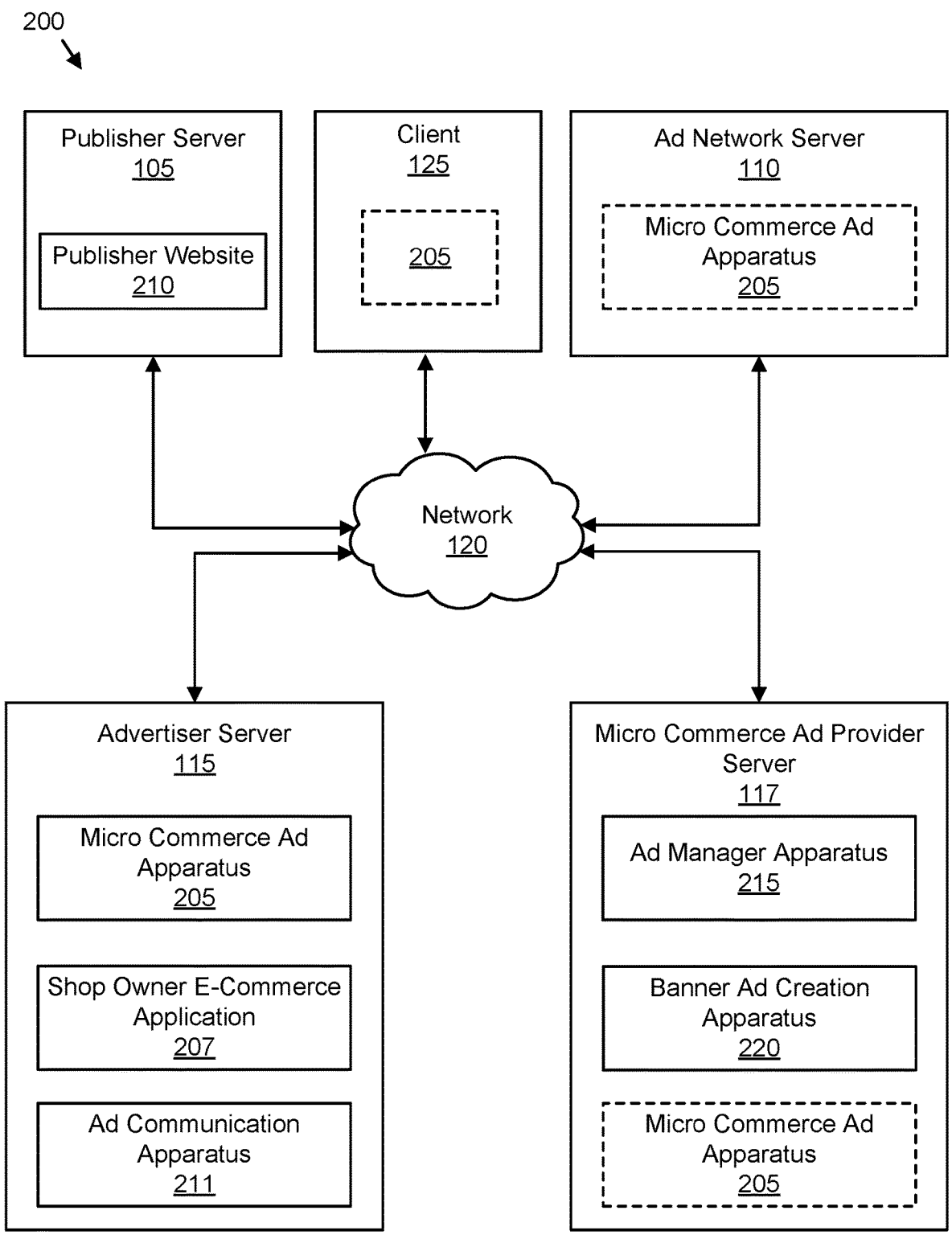
FIG. 2 is a detailed schematic block diagram illustrating another embodiment of a system for a micro commerce ad in accordance with the present subject matter.

FIG. 2 depicts a detailed embodiment of a system 200 for an electronic publication with dynamic content. The description of the system 200 refers to elements of FIG. 1, like numbers referring to like elements. The system 200 includes the publisher server 105 with a publisher web site 210, the ad network server 110, the advertiser server 115, the micro commerce ad provider server, and the network 120, which may be substantially similar to the like numbers elements in FIG. 1. Furthermore, the advertiser server 115 includes a micro commerce ad apparatus 205, a shop owner e-commerce application 207, and an ad communication apparatus 211. The micro commerce ad provider server 117 includes an ad manager apparatus 215 and a banner ad creation apparatus 220. Note that while the system depicts a micro commerce ad apparatus 205, an ad communication apparatus 211, an ad manager apparatus 215, and a banner ad creation apparatus 220, in certain embodiments, the system may include one or more of these components in various combinations.

The publisher website 210 may be embodied as one or more web pages available for access over the network 120. Each webpage may include software code, images, and text as is known in the art. Specifically, each webpage may include static and/or dynamic elements and include Hypertext Markup Language ("HTML") code, JavaScript code, Flash animations, and the like.

The publisher website 210 may include one or more spaces, slots, and/or predetermined locations on one or more of its web pages to display one or more banner ads. Conventional banner ads on publisher's web sites typically include images, animation, text, audio, video, and/or the like. These conventional banner ads in many instances provide a hyperlink when clicked on that opens up a new browser window or replaces the existing browser window with the advertiser's web site.

Likewise, with a conventional banner ad, in order to make a purchase and/or to view more items for sale by the advertiser, a user leaves the publisher website 210. For example, a visitor may be reviewing content pages of the publisher web site 210 for several types of cameras. On the same page is a conventional banner ad that advertises cameras for sale. The visitor, upon seeing a desirable camera, may leave the publisher website 210 and search for an on-line camera store or click on the banner ad to be taken to the advertiser's web site.

However, in FIG. 2, the advertiser server 115 includes a micro commerce ad apparatus 205. The micro commerce ad apparatus 205 provides visitors to a publisher website 210 an easy and direct method to enter into an interactive e-commerce transaction from within a micro commerce ad that has been made available to the client 125 from an ad network server 110 or made available directly from the advertiser server 115 as described below.

Furthermore, the micro commerce ad apparatus 205 may allow a visitor to the publisher website 210 and the publisher to contribute to what category of products and services will appear in the micro commerce ad through the setting of preferences. Consequently, the more relevant the product offerings to the visitor, the higher the percentage of sales for the advertiser resulting in higher performance revenue for the publisher and greater satisfaction for the visitor at the publisher web site 210.

For example, returning to the camera website example, the visitor may be reviewing the content pages of the publisher website 210 for several types of cameras. On the same page is a micro commerce ad that is offering cameras for sale within the micro commerce ad itself. The visitor can make a product purchase within the micro commerce ad (embodied by and/or provided by the micro commerce ad apparatus 205) while reviewing the information on the publisher page. Furthermore, the visitor does not have to leave the publisher website 210 to search for an on-line camera store or click on the banner ad to be taken to the advertiser website. In addition, in one embodiment, the micro commerce ads provided by the micro commerce ad apparatus 205 conform to banner ad market standards. Consequently, a publisher web site 210 that is configured to accept conventional banner ads may also be compatible with micro commerce ads without further modification.

In the depicted embodiment, the micro commerce ad apparatus 205 may reside and/or be fetched from the advertiser server 115, ad network server 110, and/or micro commerce ad provider server 117 as depicted. However, all or a portion of the micro commerce ad apparatus 205 may be embodied as a micro commerce ad (e.g. a banner ad configured according to the present subject matter) and be stored (in volatile and/or nonvolatile memory), copied to, redirected, and/or referenced by the advertiser server 115, the ad network server 110, the publisher server 105, the micro commerce ad provider server 117, and/or a client 125 in communication with the publisher server 105. Consequently, FIG. 2 also illustrates that the micro commerce ad apparatus 205 may exist on the client 125 (e.g. after the client 125 executes code from a published webpage of the publisher website 210 that requests a micro commerce ad). For example, a client 125 may request a banner ad from the ad network server 110, and either the ad network server 110 will serve the ad or will redirect the request to the advertiser server 115, another ad network server, or the micro commerce ad provider server 117. The advertiser server 115 may push a copy of at least a portion of the micro commerce ad apparatus 205 with a micro commerce ad to the client 125 (e.g. a browser on the client), which then displays the micro commerce ad in the banner ad slot of the publisher web site to a visitor on the client 125. Furthermore, in certain embodiments, all or a portion of the micro commerce ad apparatus 205 may also be stored and/or reside on an additional computing device in communication with one or more of the advertiser server 115, the ad network server 110, and the publisher server 105.

The advertiser server 115, in the depicted embodiment, includes a shop owner e-commerce application. The shop owner e-commerce application 207 may include "shopping cart" software or any other suitable software, provided for the shop owner, hosted by the shop owner and/or provided by the shop owner's servers, to perform and/or facilitate electronic transactions such as online purchases or generated leads (e.g. collecting information from visitors for later contact). Although FIG. 2 depicts the shop owner e-commerce application 207 residing on the advertiser server 115, in other embodiments, (e.g. in which the advertiser server 115 is controlled by a separate entity than the shop owner and/or provides advertising for the shop owner but does not host the shop owner e-commerce application 207), the shop owner e-commerce application 207 may be hosted and/or reside on another server.

A micro commerce ad of the micro commerce ad apparatus 205 may communicate with the shop owner e-commerce application 207 or ad communication apparatus 211 to perform a transaction within the micro commerce ad, to reference product inventory and/or prices from the shop owner e-commerce application 207 or Ad communication apparatus 211 and updating these in the micro commerce ad, and/or the like.

The advertiser server 115, in the depicted embodiment, includes an ad communication apparatus 211. Although FIG. 2 depicts the ad communication apparatus 211 residing on the advertiser server 115, in other embodiments, (e.g. in which the advertiser server 115 is controlled by a separate entity than the shop owner and/or provides advertising for the shop owner but does not host the shop owner e-commerce application 207), the ad communication apparatus 211 may be hosted and/or reside on another server. Furthermore, in certain embodiments, the ad communication apparatus 211 is part of, in communication with, and/or integrated with the shop owner e-commerce application 207. In one embodiment, the ad communication apparatus 211 is a plug-in to the shop owner e-commerce application 207.

The ad communication apparatus 211, in one embodiment, allows communication between the shop owner e-commerce application 207, the micro commerce ad apparatus 205 (e.g. the micro commerce ad), and/or the micro commerce ad provider server 117. The ad communication apparatus 211, in some embodiments, communicates with the micro commerce ad apparatus 205 to perform a transaction within the micro commerce ad, provide inventory and pricing information, and/or the like.

In the depicted embodiment, the micro commerce ad provider server 117 includes an ad manager apparatus 215. The ad manager apparatus 215 may facilitate communication between the micro commerce ad apparatus 205 (e.g. a micro commerce ad) and the shop owner e-commerce application 207 (e.g. by communicating with the ad communication apparatus 211). For example, during a transaction performed within a micro commerce ad, communication from the micro commerce ad to the ad communication apparatus 211 may be directed through the ad manager apparatus 215. Furthermore, the ad manager apparatus 215 may also issue security keys for secure communication between the micro commerce ad and the ad communication apparatus 211, allowing a shop owner to register and create an account to obtain micro commerce ads, and/or the like. In one embodiment, the micro commerce ad requests further instructions from the ad manager apparatus 215 for performing the transaction in the micro commerce ad as described below.

In the depicted embodiment, the micro commerce ad provider server 117 also includes a banner ad creation apparatus 220 that facilitates the creation of a banner ad by a user, such as the shop owner or someone who the shop owner has designated. Specifically, the banner ad creation apparatus 220 may create a banner ad and/or a micro commerce ad where the user (such as an advertiser) can adjust the size of product images and product display layout as well as how many items will be displayed within the banner ad/micro commerce ad. The banner ad creation apparatus 220 may provide the user with customizable options such as industry standard banner ad sizes (e.g. 160 pixels by 600 pixels). In one embodiment, the customizable options include banner ad characteristics that conform to banner ad market standards. Furthermore, the banner ad creation apparatus 220 may provide an interactive template responsive to user input. Specifically, the banner ad creation apparatus 220 may provide a drag and drop interface for product images, fonts, color, title, description, and the like. The banner ad creation apparatus 220 may generate the banner ad and/or micro commerce ad based on the selections and/or design by the user.

Although FIG. 2 depicts the banner ad creation apparatus 220 as residing in the micro commerce ad provider server 117, all or a portion of the banner ad creation apparatus 220 may be stored, reside, and/or be referenced from an additional computing device such as a user device (e.g. a desktop computer) or web server. For example, a user may create a banner ad using the banner ad creation apparatus 220 operating on the user's local computer. In one embodiment, the banner ad creation apparatus 220 is a web-based application accessible with a browser and the advertiser server 115 and/or another web server may host the banner ad creation apparatus 220 which is accessed by a user with a client 125. The banner ad creation apparatus 220 may be embodied in other suitable forms.

Figure 3A:
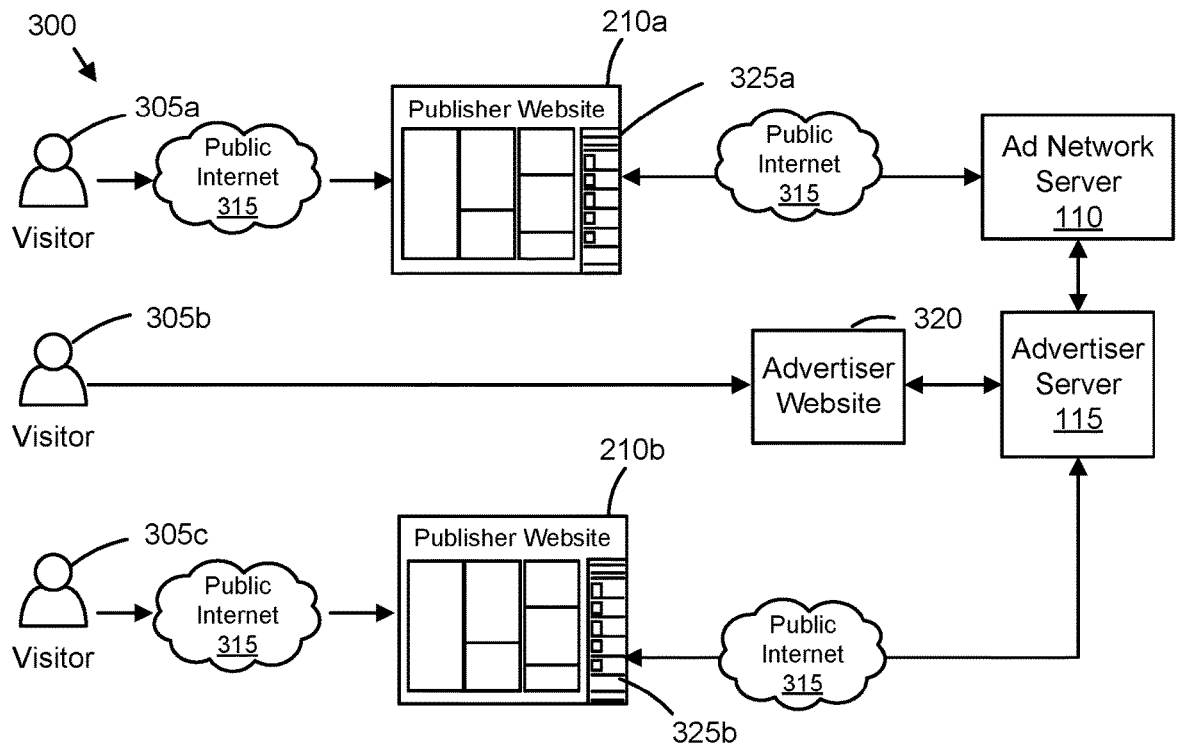
FIG. 3A is a schematic block diagram illustrating one embodiment of micro commerce ad access flow in serving a micro commerce ad prior to a visitor interacting with the micro commerce ad in accordance with the present subject matter.
Figure 3B:
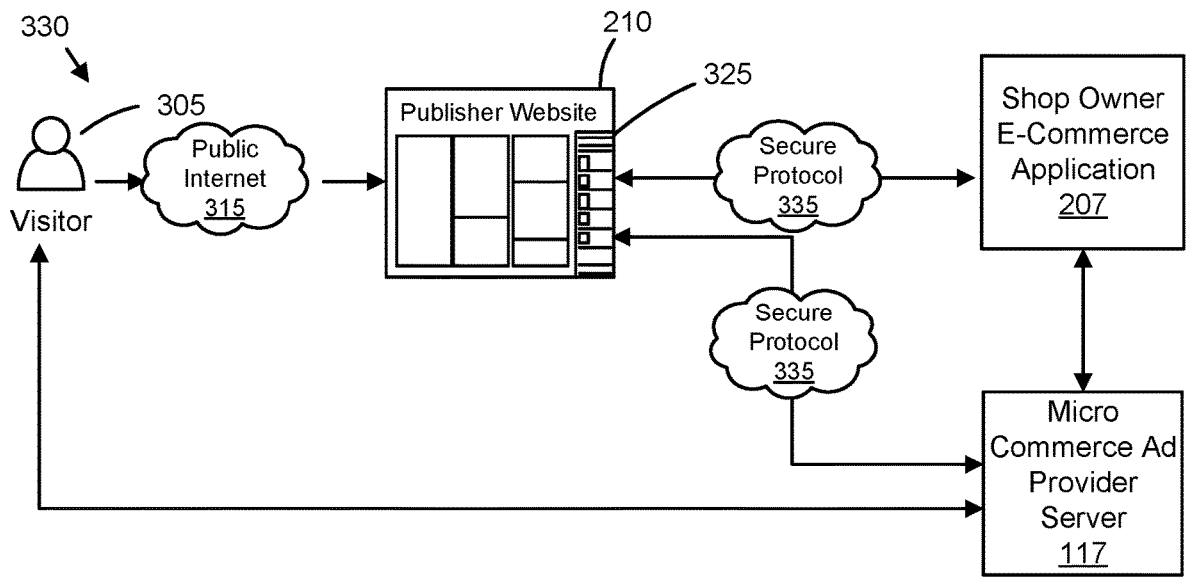
FIG. 3B is a schematic block diagram illustrating one embodiment of micro commerce ad access flow after a visitor has interacted with the micro commerce ad of FIG. 3B in accordance with the present subject matter.

FIG. 3A depicts one embodiment of micro commerce ad access flow 300 in serving a micro commerce ad 325 in accordance with the present subject matter. Specifically, FIG. 3A depicts Visitor 305a that accesses the publisher web site 210a through the public Internet 315 (e.g. by using a client such as a browser as described above). The Visitor 305a may request a banner ad from an ad network server 110 through the public Internet 315. In one embodiment, the Visitor's browser executes code from the publisher's web site 210a that requests the banner ad. In other embodiments, the publisher web site 210a (loaded and/or when loading on the Visitor's browser) may request a banner ad using a secure internet protocol as described above. The ad network server 110 delivers and/or makes a micro commerce ad 325a (e.g. an embodiment of the micro commerce ad apparatus 205) available to the publisher website 210a from an advertiser server 115 (e.g. a shop owner's server, a micro commerce ad provider server 117, or other server with ads from shop owners) or ad network server 110, for viewing by the Visitor 305a. In addition, Visitor 305b may also access a micro commerce ad 325 directly from an advertiser website 320 hosted, controlled, and/or managed by the advertiser. Furthermore, as also depicted, Visitor 305c may view a micro commerce ad 325b that the publisher's web site 210 receives directly from an advertiser server 115. Specifically, Visitor 305b may access the publisher website 210b through the public Internet 315 and the publisher website 210b may receive a micro commerce ad 325b directly from the advertiser server 115. The advertiser server 115 that supplied the micro commerce ad 325b may be integrated with or separate from the shop owner e-commerce application 207. In one embodiment, the micro commerce ad 325a,b lacks instructions (e.g. the executable code, logic, and/or software modules) configured to perform a transaction in the micro commerce ad 325a,b.

Figure 4A:
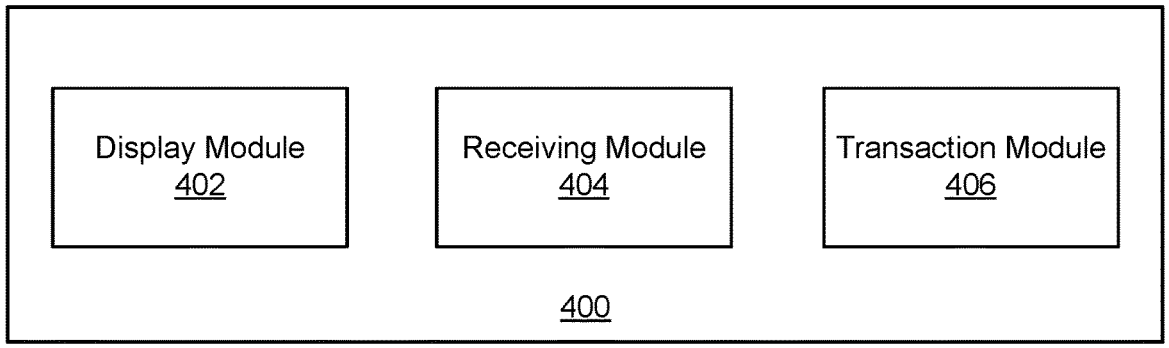
FIG. 4A is a schematic block diagram illustrating one embodiment of an apparatus for a micro commerce ad in accordance with the present subject matter.
Figure 4B:
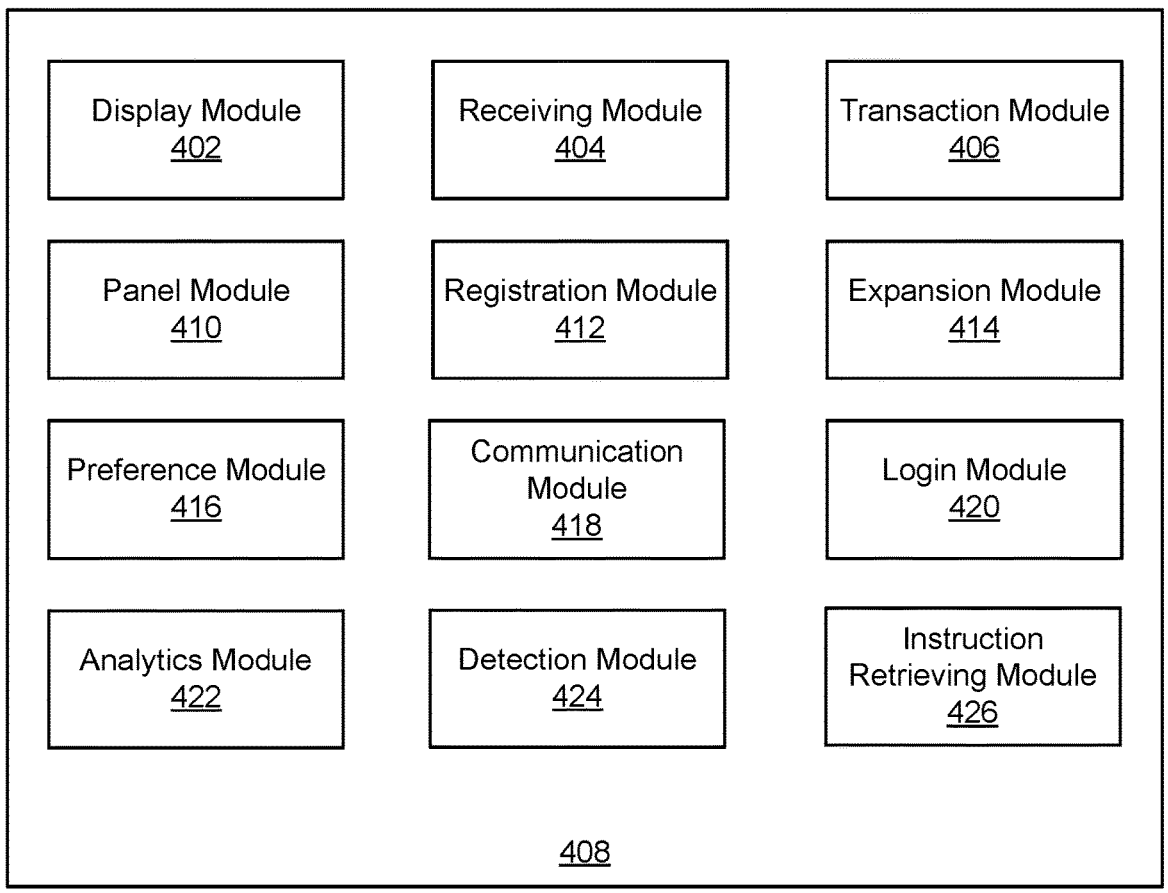
FIG. 4B is a detailed schematic block diagram illustrating another embodiment of an apparatus for a micro commerce ad in accordance with the present subject matter.

FIG. 4B depicts one embodiment of micro commerce ad access flow 330 after the publisher's web site 210 has received the micro commerce ad 325 of FIG. 3A and after the Visitor 305 has interacted with the micro commerce ad 325. The Visitor 305 may interact with the micro commerce ad 325 by clicking on the micro commerce ad 325, selecting a panel, button, and/or link on the micro commerce ad 325, hovering over the micro commerce ad 325 for a predetermined amount of time, or the like. At this point, the micro commerce ad 325 may communicate with a micro commerce ad provider (e.g. the micro commerce ad provider server 117) and/or the shop owner e-commerce application 207. In one embodiment, the micro commerce ad 325 retrieves instructions configured to execute a transaction in the micro commerce ad 325 in response to detecting a visitor interaction. In one embodiment, the micro commerce ad 325 communicates with the micro commerce ad provider server 117 and the shop owner e-commerce application 207 using a secure internet protocol 335 as described above. In addition, as described below, the micro commerce ad 325 may include one or more security keys as part of communications with the micro commerce ad provider server 117 and/or the shop owner e-commerce application 207 to prevent unauthorized parties from obtaining access to shop owner e-commerce application 207 and/or micro commerce ad 117.

The micro commerce ad provider server 117 may communicate with the micro commerce ad 325 after the Visitor 305 interacts with the micro commerce ad 325 to display product information, items for sale, switch displays of items for sale, change panel displaying the banner ad 325, and/or the like. The micro commerce ad provider server 117 may also monitor and record visitor analytics as described above.

Furthermore when Visitor 305 interacts with the micro commerce ad 325, the micro commerce ad 325 may communicate with a shop owner e-commerce application 207 (through the micro commerce ad provider server 117 or directly) to complete, process, and/or execute a transaction. In one embodiment, the micro commerce ad 325 communicates with the shop owner e-commerce application 207 without communicating through a proxy server. Furthermore, a micro-commerce ad 325 that the publisher's website receives directly from an advertiser's server 115 may also communicate with the shop owner e-commerce application 207 during a transaction. In one embodiment, the micro commerce ad 325 also communicates with the micro commerce ad provider server 117 during execution of the transaction. In certain embodiments, the shop owner e-commerce application 207 communicates with the micro commerce ad provider server 117 to, for example, transmit analytic information to the micro commerce ad provider.

FIG. 4A depicts one embodiment of an apparatus 400 for a micro commerce ad 325. Specifically, the apparatus 400 may comprise one embodiment of the micro commerce ad apparatus 205. The description of the apparatus 400 refers to elements of FIGS. 1-4B, like numbers referring to like elements. The depicted apparatus 400 includes a display module 402, a receiving module 404, and a transaction module 406. Moreover, while the depicted embodiment includes the above listed modules, in certain embodiments, the apparatus 400 may include a subset of the depicted modules and/or modules in various combinations.

The display module 402, in one embodiment, displays an advertisement in a banner ad 325. The banner ad 325 may comprise one embodiment of the micro commerce ad 325 described above. The banner ad 325 may include characteristics conforming to banner ad market standards. The advertisement may include content such as text, graphics, video, and/or the like. In one embodiment, the advertisement includes one or more items for items for sale (e.g. images and/or text descriptions of items for items for sale). In one embodiment, the advertisement includes information about goods or services as part of a lead generation campaign.

Banner ad market standards may include, but are not limited to, specifications for banner ad size, banner ad dimensions, banner ad items for sale, classification of banner ad sales items, a banner ad font, ability of the banner ad 325 to be served by an ad network, and/or the like. Furthermore, the banner ad 325 may conform to banner ad market standards, in one embodiment, by meeting banner ad market standards such that the banner ad 325 may be made available to a publisher web site 210, configured to accept conventional banner ads, without modification of the viewing client 125, publisher server 105 and/or publisher website 210 and be displayed as the advertiser intended. Consequently, the banner ad 325 may be configured to display in banner ad slots of a publisher webpage.

Figure 5:
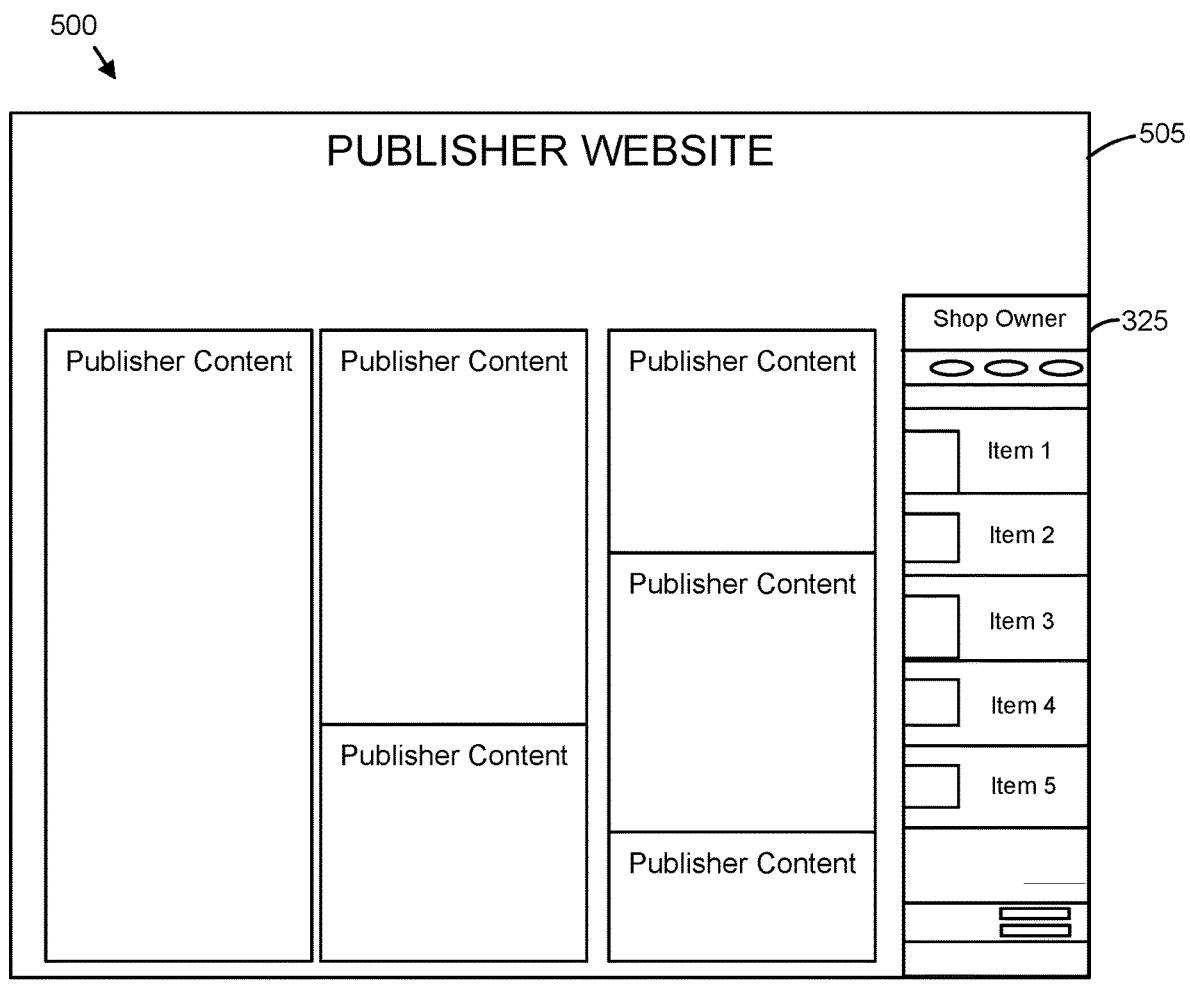
FIG. 5 illustrates one embodiment of a publisher website with a micro commerce ad in accordance with the present subject matter.

FIG. 5 depicts one embodiment of a publisher website 500 with a publisher content portion 505 and a micro commerce ad 325 in a predetermined banner ad slot, space, and/or location on the publisher website 500. Banner ad locations may vary depending on where the publisher chooses to place them, however the publisher if receiving ads from an ad network server 110 may provide a conforming space for the banner ad to be properly displayed. In FIG. 5, the publisher web site 500 includes a micro commerce ad 325 with the dimensions of 160 pixels by 600 pixels (also known in the ad industry as Wide Skyscraper). As described above, micro commerce ads 325 may conform to the current market accepted dimensions for banner ads.

Figure 6:
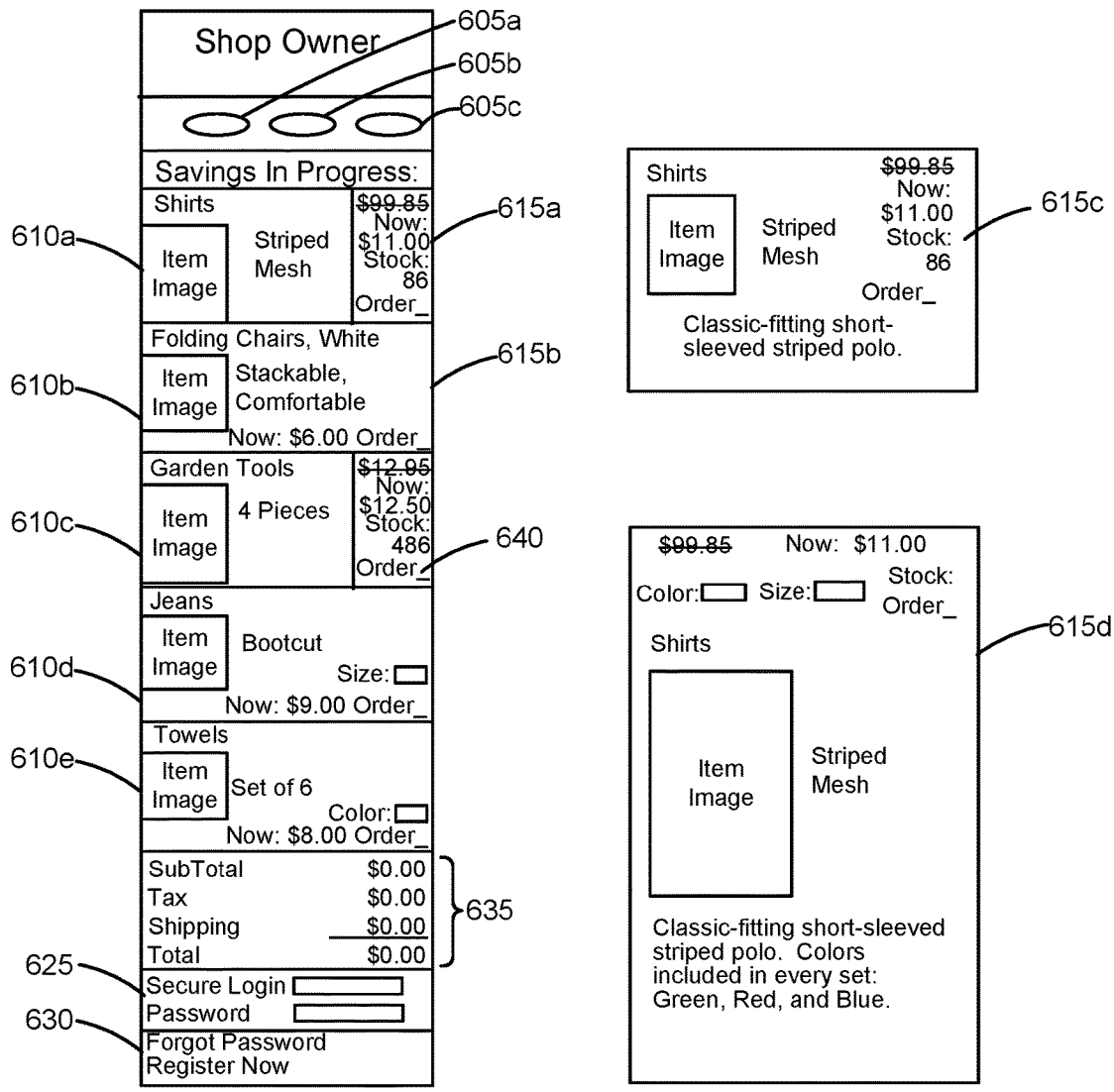
FIG. 6 illustrates one embodiment of a micro commerce ad in accordance with the present subject matter.

Referring now to FIG. 5 and FIG. 6, the display module 402 may be flexible in displaying product information, display size and layout, and number of items within the dimension of a conforming micro commerce ad 325. Specifically, FIG. 6 depicts a micro commerce ad 325 with a plurality of items for sale 610a-e. In one embodiment, the display module 402 displays the micro commerce ad 325 according to an advertiser's ad layout and displays an ad 325 using a preset layout design selected by the advertiser and/or based on product category and sub-category preferences of the publisher and the visitor. Consequently, the advertiser may control the number of displayed items for sale 610a-e. Specifically, the advertiser may set a number of sale item "slots" in the micro commerce ad 325 to "hold" items for sale 610a-e for display.

In addition, the advertiser may choose from a plurality of display formats 615a-d for each sale item 610a-e. As described below, the advertiser may configure the ad layout using the banner ad creation apparatus 220. Furthermore, the initial display size of each sale item 610a-e may vary based on the actual number of items for sale 610a-e chosen by the advertiser and the display format selected (such that the sales items 610a-e may be displayed clearly in the conforming space).

The display module 402, in one embodiment, may switch a display of a first sale item 610a-e with a display of a second sale item 710 a-d in the banner ad 325 in response to a visitor selection (e.g. a mouse click, mouse over, icon selection, and the like). Specifically, a visitor may click on a particular sale item slot displaying a particular sale item 610a-e and the display module 402 may replace the particular sale item 610a-e in the slot with another sale item 610a-e.

In addition, in certain embodiments, the display module 402 displays items for sale 610 a-e within the banner ad 325 based on visitor preferences and/or publisher preferences such as sale item classification (category and sub-category).

The receiving module 404 receives visitor input within the banner ad 325 (e.g. information supplied from a visitor through input fields in the banner ad 325). Specifically, the receiving module 404 may receive visitor input comprising purchaser credentials and an item for sale selection within the banner ad 325 from a visitor. In some embodiments, the receiving module 404 receives user address or other personal information (e.g. such as for a lead generation campaign). In FIG. 6, the receiving module 404 may receive and/or reference visitor input from input fields 625 for login information (e.g. name and password). Therefore, a visitor may login within the banner ad 325 itself. In addition, the receiving module 404 may receive and/or reference visitor input for item number from input fields 640 for an item number designating how much/many of a particular product a visitor would like. In one embodiment, the visitor enters the login information as a confirmation/authorization of the transaction. Therefore, the visitor entering the login information may be last user action to complete the transaction and the receiving module 404 may receive the login information and/or sale item information in response to the visitor selecting to complete the transaction. In one embodiment, the receiving module 404 receives visitor input such as purchaser credentials and the item for sale selection subsequent to or as the transaction module 406 performs the sales transaction.

The display module 402 and the receiving module 404 allow for the visitor, through the banner ad 325, to select various aspects of the sale item or service to be purchased such as the color of an item, the size (as in clothing), or the number of items desired.

The transaction module 406 performs, executes, and/or completes a transaction within the banner ad 325. In one embodiment, performing, executing, and/or completing the transaction within the banner ad 325 may include the transaction module 406 communicating information to and from a server (such as the advertiser server 115 and/or the micro commerce ad provider server 117). However, performing the transaction within the banner ad 325, in one embodiment, includes the transaction module 406 performing the transaction without redirecting the visitor (e.g. the browser of the visitor, the client 125 of the visitor, and/or the like) away from the publisher webpage, without opening or triggering another web page, and/or the like.

In on embodiment, performing the transaction includes processing visitor input (applying visitor input to a sale, to a lead generation, or the like), finalizing the transaction, charging a visitor's credit card, accepting the visitor's login credentials to finalize the transaction, referencing the visitor's login credentials and sales item selections from fields within the banner ad 325, referencing the visitor's personal information from fields in the banner ad 325, notifying an outside server that a transaction has occurred such that the outside server may update inventory, and the like. As stated above, in one embodiment, the visitor enters the login information as a confirmation/authorization of the transaction. Therefore, the visitor entering the login information for the transaction module 406 to use may be last visitor action to complete the transaction.

The transaction module 406 may calculate a subtotal, tax amount, and/or shipping amount. The transaction module 406 may also validate the format of information that is received by the user. Moreover, the display module 402 may display these amounts 635 for the visitor. In addition, the transaction module may generate a sales confirmation notice, also displayable by the display module 402.

In one embodiment, the transaction module 406 transmits the sales confirmation to an email address, cell phone number, messaging account, and the like associated with the visitor's account. For example, the transaction module 406 may send the sales confirmation by email to the visitor's email address. Consequently, the visitor may be notified of a completed transaction for the visitor's records, for security purposes, and the like. In one embodiment, the sales confirmation message includes a link for the visitor to cancel the order if the visitor did not place the order or otherwise wishes to cancel the order.

In one embodiment, the transaction module 406 communicates (e.g. using remote procedure calls) between the banner ad 325 and a shop owner e-commerce application 207 to perform the transaction. Furthermore, in one embodiment, the servers that host the shop owner e-commerce application 207 are separate and distinct from ad network servers 110, ad proxy servers, ad exchange servers, and the like. In one embodiment, the shop owner e-commerce application 207 executes on the advertiser server 115 as depicted in FIG. 2. In one embodiment, the transaction module 406 communicates directly between the banner ad 325 and a shop owner e-commerce application 207 (e.g. the ad communication apparatus 211) to perform the transaction. In other embodiments, the transaction module 406 communicates with the micro commerce ad provider server 117, which then forwards or redirects the communications to the shop owner e-commerce application 207 and forwards or redirects communication from the shop owner e-commerce application 207 to the banner ad 325.

In one embodiment, performing the transaction by communicating to the shop owner e-commerce application 207 includes the shop owner e-commerce application 207 (e.g. the ad communication apparatus 211) processing the transaction, finalizing the transaction, charging a visitor's credit card, accepting the visitor's login credentials to finalize the transaction, referencing the visitor's login credentials and sales item selections from fields within the banner ad 325, updating inventory, and/or the like. Performing the sales transaction within the banner ad 325, in one embodiment, includes the transaction module 406 communicating to the shop owner e-commerce application 207 to execute the sales transaction with the shop owner e-commerce application 207 as described above without redirecting the visitor away from the publisher webpage.

In one embodiment, the transaction module 406 communicates between a particular banner ad 325 and a shop owner e-commerce application 207 to perform the sales transaction without communicating through a proxy server. In a further embodiment, the transaction module communicates between the particular banner ad 325 and the shop owner e-commerce application 207 without communicating through a proxy server even if the particular banner ad 325 was served to a publisher's web site 210 from an ad network server 110.

In one embodiment, the transaction module 406 communicates between the banner ad 325 and the shop owner e-commerce application 207 (and in some embodiments, with the micro commerce ad provider server 117) through a secure connection implementing an internet security protocol. The secure connection may be a Secure Socket Layer Protocol ("SSL") connection, a Transport Layer Security ("TLS") connection, or other suitable secure connection. Furthermore, in one embodiment, as described above, the transaction module 406 communicates between the banner ad 325 and the shop owner e-commerce application 207 by way of the ad communication apparatus 211, which comprises an Application Programming Interface ("APP"), a plug-in to the shop owner e-commerce application 207, and/or other intermediate application between the shop owner e-commerce application 207 and the banner ad 325.

In one embodiment, the transaction module 406 includes a security key with each communication to the shop owner e-commerce application 207 (e.g. the ad communication apparatus 211). The ad communication apparatus 211 may interact with the micro commerce ad provider server 117, to create, obtain, manage, and/or invalidate security keys. In one embodiment, the transaction module 406 obtains a security key from the micro commerce ad provider server 117 prior to a transaction. The shop owner e-commerce application may also obtain the security key. Subsequent communications between the transaction module 406, the micro commerce ad provider server 117, and the shop owner e-commerce application 207 may include the security key such that these entities recognize valid communications. In one embodiment, communication between these entities is performed using remote procedure calls to a specified Uniform Resource Locator ("URL") provided by the micro commerce ad provider server 117 and using the security key with each communication.

In one embodiment, the security key includes one or more variable identifiers. Examples of these variable identifiers may include, but are not limited to a shopping cart unique ID representing a shop owner identifier, a shopping cart vendor version string, a campaign ID, and the like. Of course, any suitable identifier may be included in the security key. The shopping cart unique ID may be shop owner-specific and/or a shop owner may have multiple shopping cart unique IDs for various online shops (e.g. one for a shop owner's shoe store, one for the shop owner's bookstore, and the like). In one embodiment, the shopping cart unique ID is a random identifier for a shop owner and/or a shop owner's particular shopping cart. The shopping cart vendor version string may represent a software version and/or source identifier of the shop owner e-commerce application 207 and/or the software version/source identifier of the plug-in to the shop owner e-commerce application 207 (e.g. the ad communication apparatus 211). The campaign ID may identify a shop owner's campaign associated with a particular transaction. A campaign may represent a division of a shop owner's sales such as a particular sales period, a sale, and the like.

In one embodiment, a shop owner obtains one or more values for the security key, such as a shop owner identifier (for the shopping cart unique ID), from the micro commerce ad provider server 117 such as when an ad 325 is created as described below. The micro commerce ad provider server 117 may generate a random shopping cart unique ID for the shop owner and associate it with a shop owner's account maintained by the micro commerce ad provider server 117. The micro commerce ad provider server 117 may generate an initial security key, which the shop owner may provide to the shop owner e-commerce application 207 and/or ad communication apparatus 211 as described below.

In some embodiments, the ad communication apparatus 211 may invalidate one or more keys and/or values in the key and may signal the micro commerce ad provider server 117 to invalidate the values from a key in the micro commerce ad provider's database (e.g. stored by the micro commerce ad provider server 117).

FIG. 4B depicts one embodiment of an apparatus 408 for a micro commerce ad 325. Specifically, the apparatus 408 may comprise one embodiment of the micro commerce ad apparatus 205. The description of the apparatus 408 refers to elements of FIGS. 1-2 and 4A, like numbers referring to like elements. The depicted apparatus 408 includes the display module 402, the receiving module 404, and the transaction module 406, wherein these modules may be substantially similar to the like-named modules described above. Furthermore, the apparatus 408 also includes a panel module 410, a registration module 412, an expansion module 414, a preference module 416, a communication module 418, a login module 420, an analytics module 422, a detection module 424, and an instruction retrieving module 426. Moreover, while the depicted embodiment includes the above listed modules, in certain embodiments, the apparatus 408 may include a subset of the depicted modules and/or modules in various combinations.

The panel module 410 changes a display in the banner ad 325 from a first panel to a second panel in response to the visitor selecting a panel indicator for the second panel. Referring also to FIG. 6, the banner ad 325 may include a plurality of panels. As used herein, a panel may refer to a distinct display in the banner ad 325. In one embodiment, the panels include a storefront panel, depicted in FIG. 6, a settings panel, allowing a visitor to set preferences including categories and sub-categories of desired sales items 610a-e, and an information panel that may include information about the advertiser, customer support information, a return policy, and the like. In one embodiment, the banner ad 325 includes a registration panel that allows a visitor to register with the advertiser for future purchases.

The panels may be selected by a visitor in response to a mouse-over, a mouse click, selecting an icon, and the like. FIG. 6 depicts icons 605a-c representing the various available panels such as an icon for the storefront panel 605a, settings panel 605b, and the information panel 605c.

In one embodiment, if information for display in a particular panel does not fit within a display of the panel, the display module 402 may allow scrolling in the particular panel.

The registration module 412 performs an initial registration of a visitor. In one embodiment, the registration module 412 performs the initial registration within the banner ad 325. Specifically, the registration module 412 may provide a visitor with a plurality of input fields within the banner ad 325 for name, address, payment information, and the like, to register a visitor with the advertiser. Furthermore, the registration module 412 may then reference, receive, and/or obtain the information in these registration fields, communicate them to a server, such as the advertiser server 115 or with the micro commerce ad provider server 117, and receive a verification of whether the registration is successful, without redirecting the visitor away from the publisher webpage. In addition, the registration module 412 may also display a registration confirmation notification and/or a registration failure notification within the banner ad 325.

In one embodiment, the registration module 412 includes a link to the advertiser's website for the visitor to register on the advertiser's website (e.g. a web page hosted by the advertiser server 115 for or in behalf of a shop owner). In one embodiment, at least a portion of the registration module 412 resides on the advertiser server 115 for the visitor to register on the advertiser's website. In a further embodiment, the visitor's shipping address may be maintained on the advertiser's web site and not within the banner ad 325 for security purposes. Upon initial registration, the registration module 412 may place a cookie on the visitor's browser such that the banner ad 325 may recognize and/or validate the visitor's browser.

Figure 7:
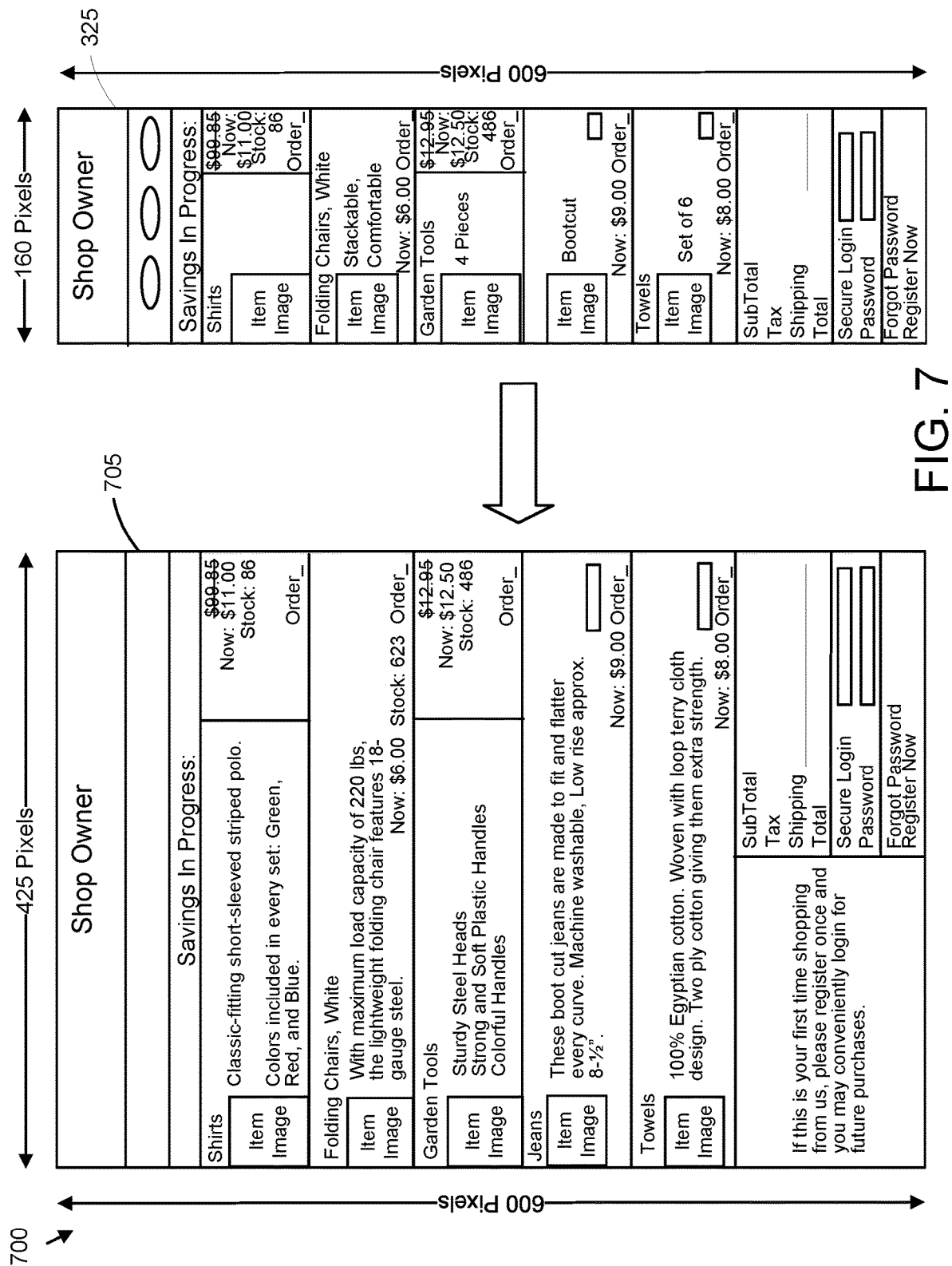
FIG. 7 illustrates one embodiment of a micro commerce ad display in accordance with the present subject matter.

Referring to FIG. 4B and FIG. 7, the expansion module 414 expands 700 the banner ad 325 across the publisher webpage in response to a visitor selection. Specifically, a visitor may execute a visitor selection (such as a mouse-over, mouse click, and the like) on the micro commerce ad 325 and the ad 325 may expand to a preset width defined by the advertiser, in this instance, 425 by 600 pixels. This provides space for additional information to appear about the items for sale and options available to the visitor. The visitor may be able to select items, product options, review the total cost, and complete and approve the transaction within the expanded micro commerce ad 700 as described above.

The preference module 416 references, manages, receives, and/or determines visitor preferences and/or publisher preferences. Consequently, the display module 402 may display items for sale within the banner ad 325 based on visitor preferences and/or the publisher preferences. Preferences may include desired categories of items for sale, sub-categories of items for sale, purchase history of the visitor, and the like. In one embodiment, the preference module 416 may access data from a particular publisher (e.g. by accessing a database on the advertiser server 115) to look up publisher's preferences on categories and sub-categories of items for sale to which a publisher may prefer to target ads.

In one embodiment, the preference module 416 may locate a visitor identifier as a cookie on a visitor's browser. Using the visitor identifier, the preference module 416 may access the database to look up visitor's preferences on categories and sub-categories of items for sale. The preference module 416 may also look up advertiser's available products based on the publisher and the visitor preferences on categories and sub-categories to populate the micro commerce ad 325.

The preference module 416 may provide for the publisher to select from category and sub-category lists of products and services. The publisher may sets these preferences by visiting the advertiser server where the publisher may register as a publisher and may view and edit preferences for products and services.

In one embodiment, a registered visitor may visit the advertiser's website to select preferences. Whether the visitor sets up preferences for the first time or edits existing preferences, in one embodiment, the visitor may be able to view a list of currently available product categories and sub-categories. The visitor may then select from the product categories and sub-categories. A visitor, in one embodiment, may also set and/or modify preferences from within the banner ad 325 itself, using, for example, the settings panel as described above. Preferences may be then stored in the visitor's account. The visitor may view or edit price range options, payment method preferences, preferred shipping address, and the like.

The communication module 418 communicates between the banner ad 325, an advertiser server 115, the micro commerce ad provider server 117, or other server managing the banner ad 325, using an intermittent connection and/or a persistent connection. In one embodiment, the advertiser may choose, when creating the banner ad 325 (such as through the banner ad creation apparatus 220 described below) whether the communication module 418 communicates with an intermittent connection or a persistent connection. In one embodiment, if the advertiser chooses a persistent connection, items for sale and/or sale item information (e.g. price, quantity, and the like) may be updated and/or rotated to provide a greater number of items for sale selections. In one embodiment, the communication module 418 communicates with the shop owner e-commerce application 207 and references product inventory and/or prices from the shop owner e-commerce application 207. The display module 402 may then update product inventor and/or prices in the advertisement of the banner ad 325 based on the communication. The communication module 418 may communicate using remote procedure calls as described above. Of course, any suitable communication method may be used.

The login module 420 may manage logging in a visitor and/or determine whether a visitor is authorized, logged in, and/or registered. The login module 420 may access a database (e.g. on the advertiser server 115) to look up and verify a visitor's credentials.

In one embodiment, the analytics module 422 stores analytic information including but not limited to visitor interaction with banner ads 325 (clicks, panel views, and the like), an IP address of visitors, URLs of publisher websites 210 that includes the banner ads 325, and the like. The analytics module 422 may communicate the analytic information to a third-party entity to maintain the analytic information or to compare the analytic information with information from an ad network.

The detection module 424, in one embodiment, detects a visitor interaction with the banner ad 325. The visitor interaction may include, but is not limited to, the visitor clicking on the banner ad 325, selecting a panel, button, and/or link on the banner ad 325, hovering over the banner ad 325 for a predetermined amount of time, and/or the like. As described above, in one embodiment, the banner ad 325, when received by a client 125 for display in the banner ad slot and prior to detecting the user interaction, lacks the instructions configured to perform the transaction in the banner ad 325.

Therefore, the instruction retrieving module 426, in one embodiment, retrieves instructions configured to execute the transaction in the banner ad 325 in response to the detection module 424 detecting the user interaction with the banner ad 325. The instruction retrieving module 426, in one embodiment, retrieves instructions by sending a request to the ad manager apparatus 215 (e.g. the micro commerce ad provider server 117) for instructions and receives the instructions from the ad manager apparatus 215 in a response to the request. The transaction module 406 performs the transaction using the instructions. In one embodiment, the instructions comprise all or a portion of the transaction module 406. In one embodiment, the instructions also include information to allow the banner ad 325 to communicate with the shop owner e-commerce application 207. In one embodiment, the instruction retrieving module 426 retrieves the instructions from a server distinct from a server hosting the publisher webpage.

Figure 4C:
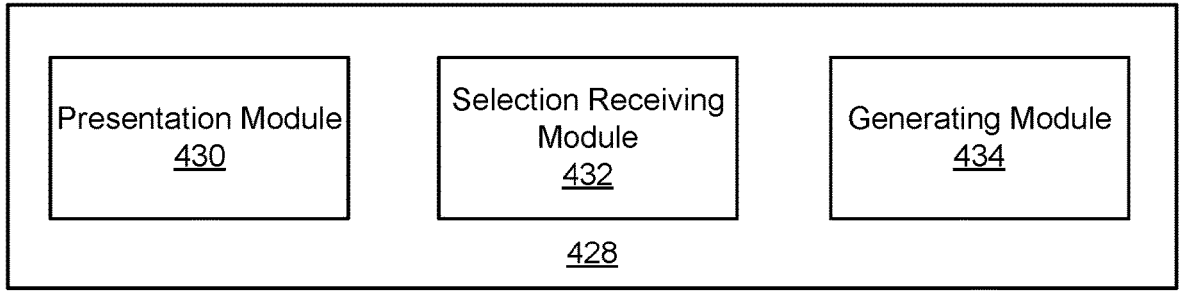
FIG. 4C is a schematic block diagram illustrating one embodiment of an apparatus for a banner ad creation apparatus in accordance with the present subject matter.

FIG. 4C depicts one embodiment of an apparatus 432 for banner ad creation. Specifically, the apparatus 432 may comprise one embodiment of the banner ad creation apparatus 220. The description of the apparatus 432 refers to elements of FIGS. 1-4B, like numbers referring to like elements. The apparatus 432 includes a presentation module 430, a selection receiving module 432, and a generating module 434. Moreover, while the depicted embodiment includes the above listed modules, in certain embodiments, the apparatus 432 may include a subset of the depicted modules and/or modules in various combinations.

The presentation module 430 presents a user with one or more customizable options for a banner ad 325. The one or more customizable options may specify banner ad characteristics conforming to banner ad market standards. Furthermore, the banner ad 325 may comprise a micro commerce ad 325 as described above that is configured to display an advertisement, receive visitor input, and perform a transaction within the micro commerce ad 325 itself. The user may be the advertiser, a shop owner, and/or otherwise affiliated with the advertiser and/or shop owner.

In one embodiment, presenting the user with the one or more customizable options further comprises presenting the user with one or more options specifying a banner ad size, banner ad items for sale, a number of slots for items for sale and whether the visitor may view different items for sale in a particular slot, a banner ad font, a connection type (persistent or intermittent), a number of items for sale, a user selection definition, a banner ad layout, and a price display specification.

In one embodiment, the presentation module 430 provides an interactive template for display to the user. The interactive template may visually display at least a subset of the one or more customizable options and the interactive template may be responsive to user input. For example, in one embodiment, the interactive template may allow a user to drag and drop sale item images onto the template.

The selection receiving module 432 receives one or more user selections associated with at least one of the one or more customizable options. The selection receiving module 432 may receive the user selections through a graphical user interface as is known in the art.

The generating module 434 generates the banner ad 325 based on the user selections. The generating module 434 may also generate a preview of the banner ad 325 for the user to approve. The generated banner ad 325 may include text, images, Hypertext Markup Language ("HTML") code, JavaScript code, Flash animations, and the like.

Figure 4D:
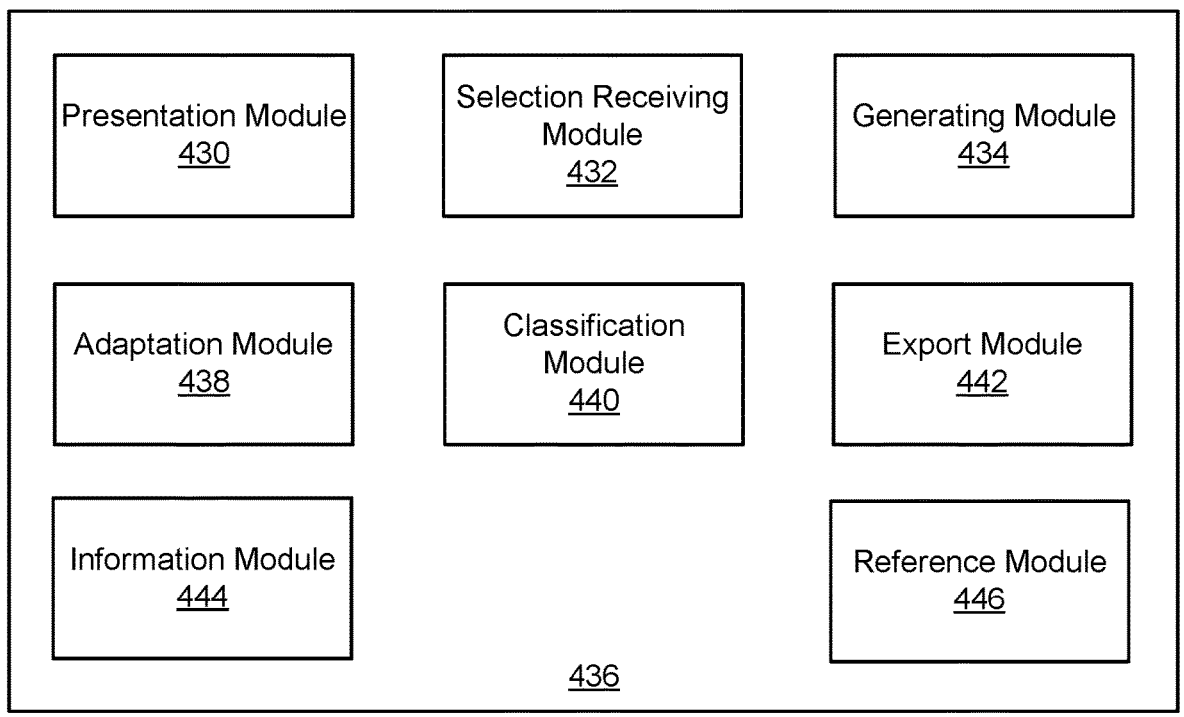
FIG. 4D is a detailed schematic block diagram illustrating another embodiment of an apparatus for a banner ad creation apparatus in accordance with the present subject matter.

FIG. 4D depicts one embodiment of an apparatus 436 for banner ad creation. Specifically, the apparatus 436 may comprise one embodiment of the banner ad creation apparatus 220. The description of the apparatus 436 refers to elements of FIGS. 1-4C, like numbers referring to like elements. The depicted apparatus 436 includes the presentation module 430, the selection receiving module 432, and the generating module 434, wherein these modules may be substantially similar to the like-named modules described above. Furthermore, the apparatus 436 may also include an adaptation module 438, a classification module 440, an export module 442, an information module 444, and a reference module 446. Moreover, while the depicted embodiment includes the above listed modules, in certain embodiments, the apparatus 436 may include a subset of the depicted modules and/or modules in various combinations.

The adaptation module 438 adapts one or more additional customizable options based on a user selection for at least one of the customizable options. For example, if a user chooses a certain banner ad size, the adaptation module 438 may adapt the number of available items for sale within the banner ad 325 based on the chosen size. For example, if sale item information in a sale item slot below a certain pixel height renders the sale item information unviewable, the adaptation module 438 may adapt the customizable options such that the number of sale item slots within the banner ad 325 does not reduce each sale item slot to below the pixel threshold.

The customizable options may include sale item classifications and the classification module 440 classifies one or more items for sale with the one or more sale item classifications based on one or more user selections of sale item classifications. In one embodiment, the sale item classifications conform to banner ad market standards.

The export module 442, in one embodiment, exports the banner ad 325 to an advertiser server 115. The export module 442 may export the banner ad 325 by copying it, moving it, and or otherwise making the banner ad 325 available to the advertiser server 115 and/or an additional server for use with a publisher website. In one embodiment, the export module 442 exports the banner ad 325 or otherwise make the banner ad 325 available to be served on an ad network server and/or ad exchange.

The information module 444 may reference and/or store the customizable options for the banner ad 325 such as a list of available banner ad sizes, product title, description, and image(s) related to a product identifier, and the like. In one embodiment, as new options become available (e.g. when banner ad market standards change), the information module 444 may provide these options for use in banner ad creation.

The reference module 446 references a shop owner e-commerce application 207 specifications. In one embodiment, the reference module 446 references the specifications by way of an API for the e-commerce application. In one embodiment, the API allows communication between the banner ad creation apparatus 220 and the owner's e-commerce application (e.g. through the ad communication apparatus 211). The API may be implemented by an entity other than the shop owner, the e-commerce application, and/or the micro commerce ad provider. In other embodiments, the API may be provided by the micro commerce ad provider. In one embodiment, the API is implemented by a plug-in and/or integrated with the shop owner e-commerce application 207 through the ad communication apparatus 211. The specifications may include function names, server names, passwords, variable requirements, and the like for performing a transaction with the shop owner e-commerce application software.

Figure 4E:
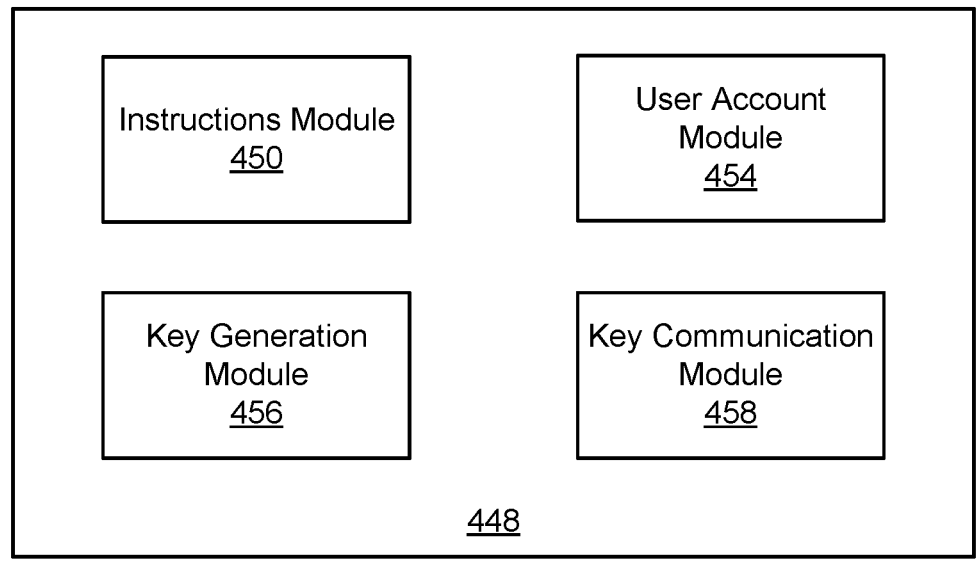
FIG. 4E is a schematic block diagram illustrating one embodiment of an apparatus for managing a micro commerce ad in accordance with the present subject matter.

FIG. 4E depicts one embodiment of an apparatus 448 for managing a micro commerce ad 325. Specifically, the apparatus 448 may comprise one embodiment of the ad manager apparatus 215. The depicted apparatus 448 includes an instructions module 450, a user account module 454, a key generation module 456, and a key communication module 458. Moreover, while the depicted embodiment includes the above listed modules, in certain embodiments, the apparatus 548 may include a subset of the depicted modules and/or modules in various combinations.

The instructions module 450, in one embodiment, receives a request from a banner ad 325 requesting instructions configured to perform a transaction in the banner ad 325. The banner ad 325 may be a micro commerce ad 325 as described herein. The instructions module 450, in on embodiment, sends the instructions to the banner ad 325. As described above, the banner ad 325, in certain embodiments, lacks instructions to perform a transaction prior to receiving the instructions from the instructions module 450.

The user account module 454, in one embodiment, receives a user registration from a shop owner associated with a shop owner e-commerce application 207. The user account module 454 may provide an account for the shop owner who may register with a user name and password.

The key generation module 456, in one embodiment, generates one or more security keys to facilitate secure communication between the banner ad 325 (e.g. a micro commerce ad 325) and the shop owner e-commerce application 207 and/or ad communication apparatus 211, as described above.

The key communication module 458, in one embodiment, sends security keys to a shop owner e-commerce application 207 (e.g. the ad communication apparatus 211). In certain embodiments, the key communication module 458 also provides and/or sends one or more of the security keys to the banner ad creation apparatus 220, which may generate the banner ad 325 with one or more of the security keys.

Figure 4F:
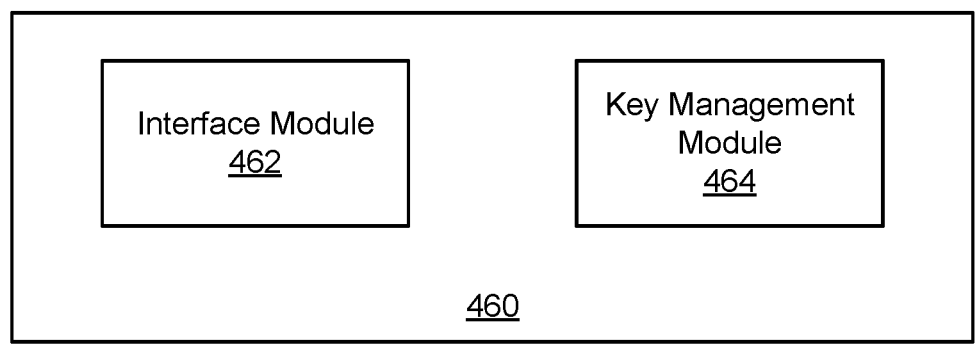
FIG. 4F is a schematic block diagram illustrating one embodiment of an apparatus for interfacing with a micro commerce ad in accordance with the present subject matter.

FIG. 4F depicts one embodiment of an apparatus 460 for interfacing with a micro commerce ad 325. Specifically, the apparatus 460 may comprise one embodiment of the ad communication apparatus 211. The depicted apparatus 460 includes an interface module 462 and a key management module 464.

The interface module 462, in one embodiment, communicates with a micro commerce ad 325 (e.g. the micro commerce ad apparatus 205) and/or the micro commerce ad provider server 117 (e.g. the ad manager apparatus 215). The interface module 462, in one embodiment, communicates with the micro commerce ad 325 as part of a transaction performed in the micro commerce ad 325. The interface module 462, in some embodiments, communicates and/or receives product information, items for sale, security keys, and the like with the micro commerce ad 325. During a transaction, the interface module 462 may receive a visitor's credit card information, login credentials, selected items for sale, and/or the like.

The interface module 462, in one embodiment, communicates with a micro commerce ad 325 and/or the micro commerce ad provider server 117 using remote procedure calls over a secure connection, as described above, and according to an Application Programming Interface ("APP") the specifies methods and function calls.

The key management module 464, in one embodiment, receives one or more security keys from the micro commerce ad provider server 117. The key management module 464, in certain embodiments, includes a current security key in communications with the micro commerce ad 325 and/or the micro commerce ad provider server 117. The key management module 464 may also validate security keys in incoming messages from a micro commerce ad 325.

Figure 8A:
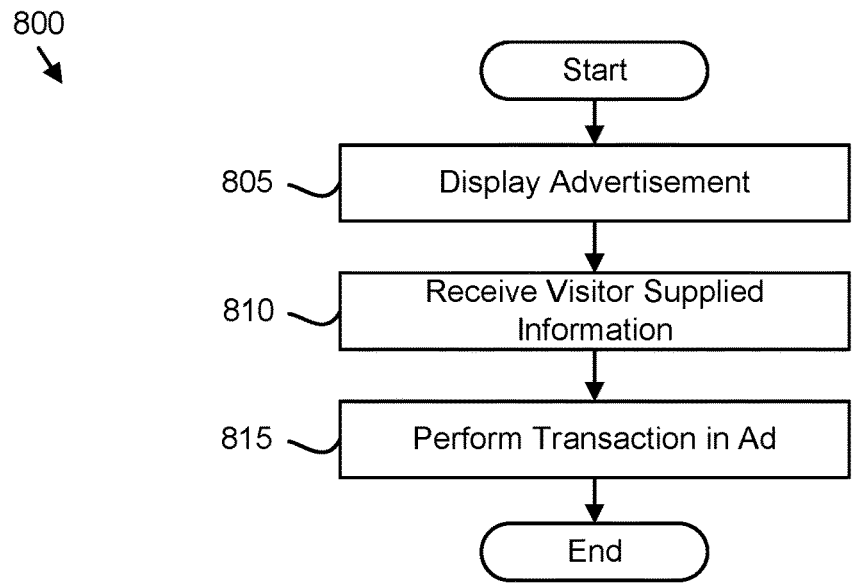
FIG. 8A is a schematic flow chart diagram illustrating one embodiment of a method for a micro commerce ad in accordance with the present subject matter.

FIG. 8A depicts one embodiment of a method 800 for a micro commerce ad 325. The method 800 begins and the display module 402 displays 805 an advertisement in a banner ad 325. The advertisement may include one or more items for sale. The banner ad 325 includes characteristics conforming to banner ad market standards. Furthermore, the banner ad 325 is configured for display in a banner ad slot of a publisher webpage. Next, the receiving module 404 receives 810 visitor input within the banner ad 325 from a visitor. The visitor input may include purchaser credential, an item for sale selection, a visitor's contact information for a lead, and/or the like. Next, the transaction module 406 performs 815 a transaction to process the visitor input within the banner ad 325. In one embodiment, the receiving module 404 receives visitor input such as purchaser credentials and the item for sale selection subsequent to or as the transaction module 406 performs the transaction. Then, the method 800 ends.

Figure 8B:
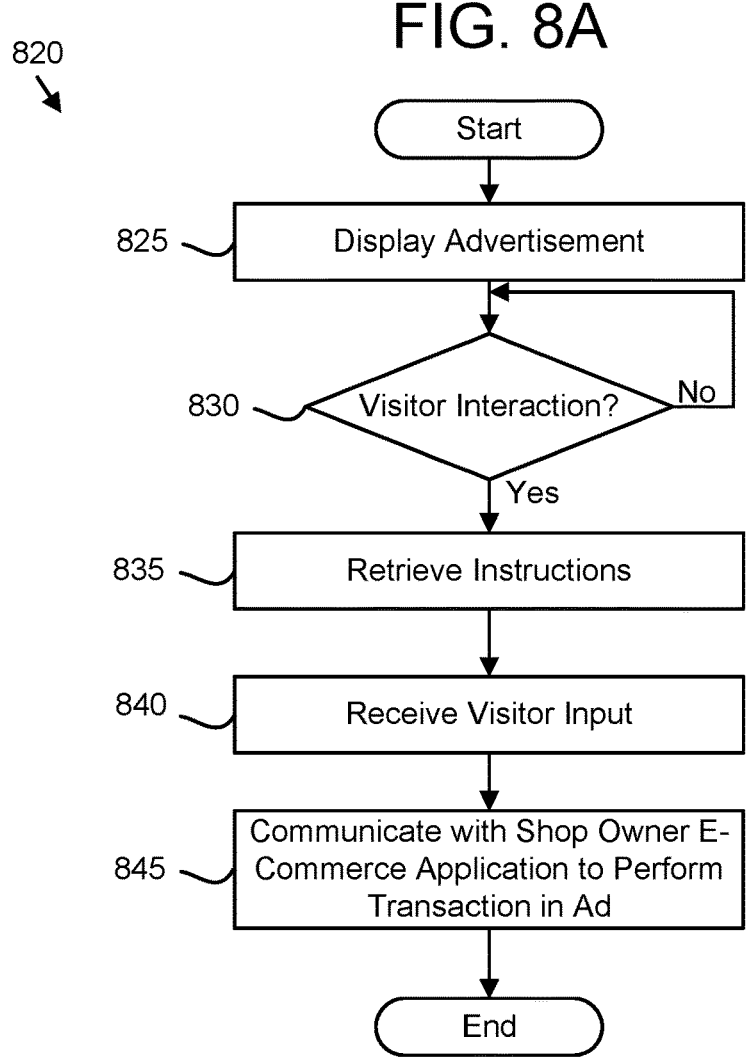
FIG. 8B is a schematic flow chart diagram illustrating another embodiment of a method for a micro commerce ad in accordance with the present subject matter.

FIG. 8B depicts one embodiment of a method 800 for a micro commerce ad 325. The method 820 begins and the display module 402 displays 805 an advertisement in a banner ad 325. The banner ad 325 may be one embodiment of the micro commerce ad 325 described herein. The banner ad 325 includes characteristics conforming to banner ad market standards. Furthermore, the banner ad 325 is configured for display in a banner ad slot of a publisher webpage. In one embodiment, the banner ad 325 lacks instructions configured to perform a transaction.

Next, if the detection module detects 830 a visitor interaction with the banner ad 325, the instructions module 450 retrieves 835 instructions configured to execute a transaction in the banner ad 325. The receiving module 404 receives 840 visitor input, such as purchaser credentials and an item for sale selection, within the banner ad 325 from a visitor. Next, the transaction module 406 communicates 845 with a shop owner e-commerce application 207 and the transaction module 406 coordinates with the shop owner e-commerce application 207 to perform 945 the transaction within the banner ad 325 to process the visitor input using the instructions. Then, the method 920 ends.

Figure 9A:
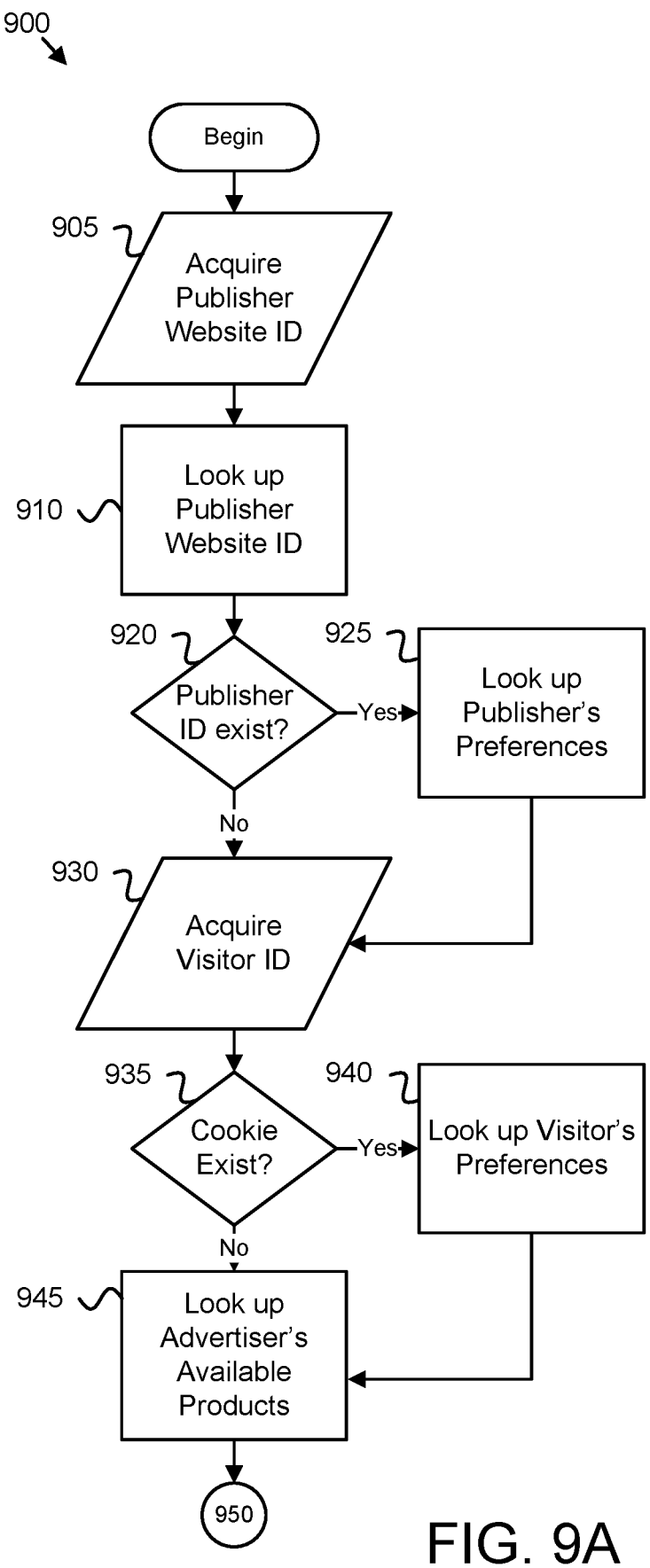
FIG. 9A and FIG. 9B are a detailed schematic flow chart diagram illustrating one embodiment of method for a visitor cart panel in accordance with the present subject matter.
Figure 9B:
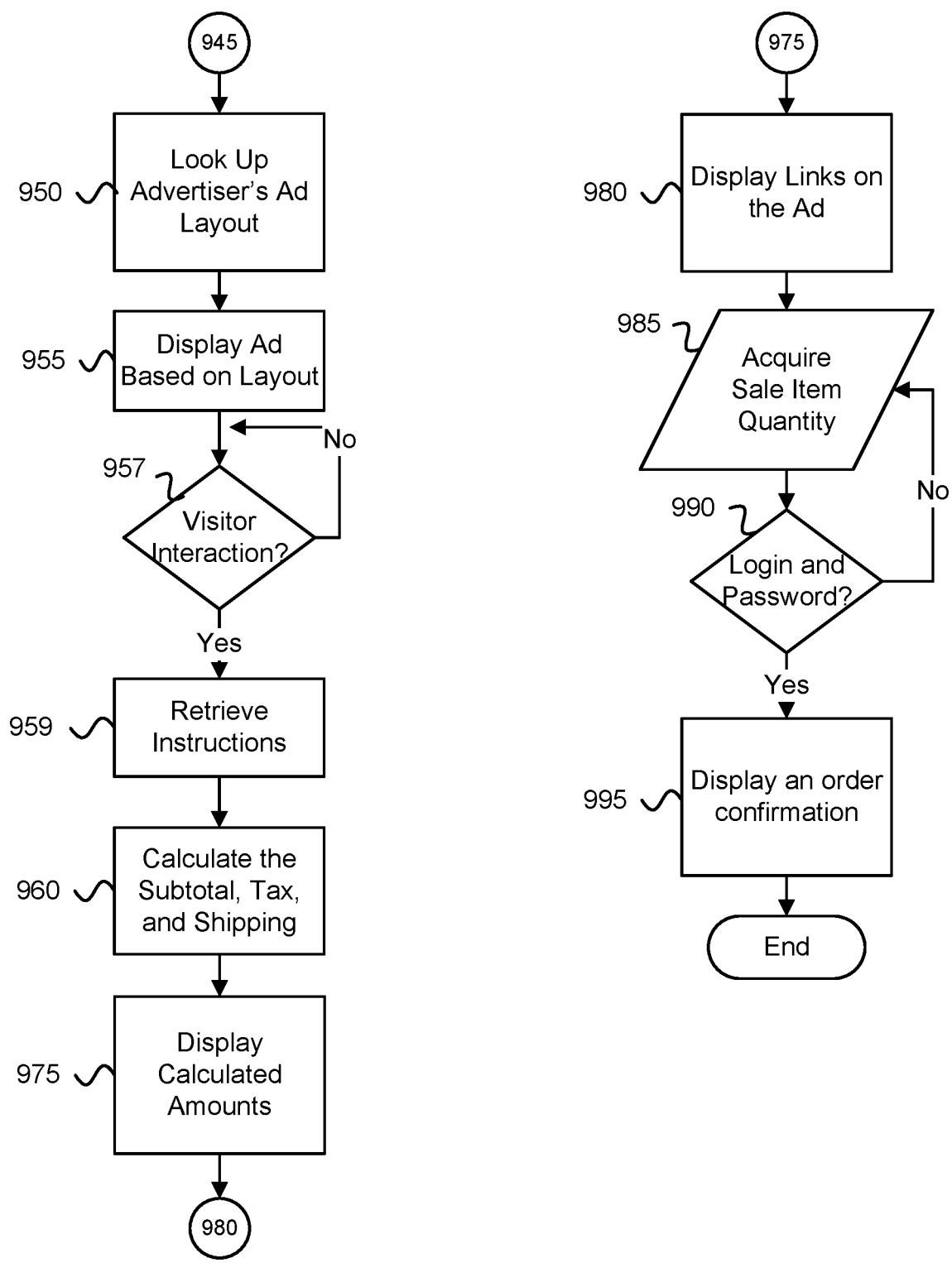

FIGS. 9A and 9B depict one embodiment of a method 900 for a visitor cart panel. The method 900 begins and the preference module 416 acquires 905 a publisher web site identifier of Publisher's web site 210. The publisher web site identifier may be based on a Uniform Resource Locator ("URL") of the publisher website. Next, the preference module 416 looks up 910 the publisher website identifier (such as on a database of the advertiser server 115). If the preference module 416 determines 920 that the publisher web site identifier exists in the database, the preference module 416 may initiate access of the database to look up 925 Publisher's preferences on categories and sub-categories of items for sale.

If the preference module 416 determines 920 that the publisher website identifier does not exist in the database, and after step 925, the preference module 416 acquires 930 a visitor identifier. For example, the preference module 416 may acquire a visitor identifier based on Visitor's cookie set on Visitor's browser. Specifically, if the preference module 416 determines 935 that Visitor's cookie exists on Visitor's browser, the preference module 416 looks up 940 Visitor's preferences on categories and sub-categories. In one embodiment, the preference module 416 initiates access of the database on the advertiser server 115 to look up Visitor's preferences.

Alternatively, and following step 940, the preference module 416 looks up 945 Advertiser's available products based on Publisher and Visitor preferences on categories and sub-categories in the database. Continuing with step 950 on FIG. 9B, the display module 402 looks up 950 the proper Advertiser's ad layout from the possible Advertiser's pool of ad layout and displays 955 an ad based on a preset layout design selected by advertiser and/or on product category and sub-category preferences of publisher and visitor. If the detection module 424 detects a visitor interaction, the instruction retrieving 526 module retrieves the instructions. The transaction module 406 calculates 960 the subtotal based on the quantity entered by the Visitor multiplied by the product price, the tax amount based on the percentage of tax charged by specified Visitor's shipping state and shipping amount based on the freight company and shipping method specified by Visitor's preference. In one embodiment, the ad communication apparatus 211 performs the actual calculations. The retrieved instructions may include instructions to make the calculations and/or instructions to facilitate the transaction module 406 communicating with the ad communication apparatus 211 to make the calculations.

The display module 402 then displays 975 calculated amounts on the micro commerce ad 325 to include: subtotal, tax, shipping, and total. The display module 402 displays 980 on the micro commerce ad 325 a Login, Password, Forgot Password, and Registration links. The transaction module 406 acquires 985 a quantity on selected items for sale by Visitor and determines 990 if Visitor has entered a login and password. If the transaction module 406 determines 990 that Visitor has entered a login and password, the transaction module 406 displays 995 an order confirmation and the method 900 ends.

Figure 10:
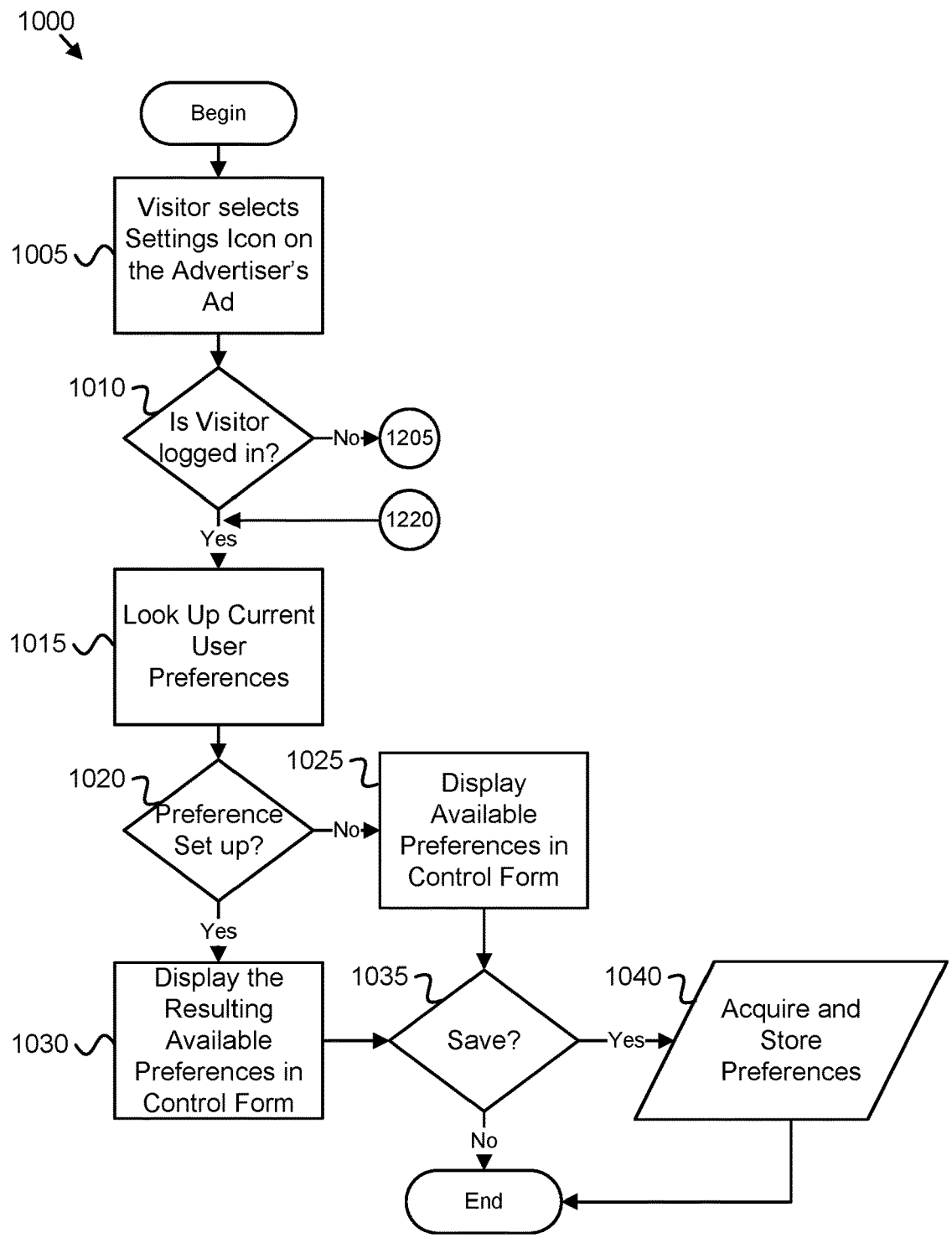
FIG. 10 is a detailed schematic flow chart diagram illustrating one embodiment of a method for visitor preferences of a micro commerce ad in accordance with the present subject matter.

FIG. 10 depicts one embodiment of a method 1000 for visitor preferences of a micro commerce ad 325. The method 1000 begins and Visitor selects 1005 settings icon on the micro commerce ad 325. The login module 420 determines 1010 if Visitor is logged in. If no, the method may move to step 1205 in FIG. 12 to login Visitor. If the login module 420 determines 1010 that Visitor is logged in (and after Visitor is logged in), the preference module 416 looks up 1015 the list of the current user preferences from the database. If the preference module 416 determines 1020 that Visitor's preferences are set up, the display module 402 displays 1030 the resulting available preferences. In one embodiment, the display module 402 displays the resulting available preferences in a control form filled with current User's preferences along with SAVE and CANCEL button links. Alternatively, if the preference module 416 determines 1020 that Visitor's preferences are not setup, the display module 402 displays 1025 available preferences. In one embodiment, the display module 402 displays a control form with the available preferences filled with blanks along with SAVE and CANCEL button links. If the receiving module 404 detects 1035 the user click the SAVE link, the preference module 416 acquires and stores 1040 data about User's preferences and the method 1000 ends. Alternatively, the method 1000 ends.

Figure 11:
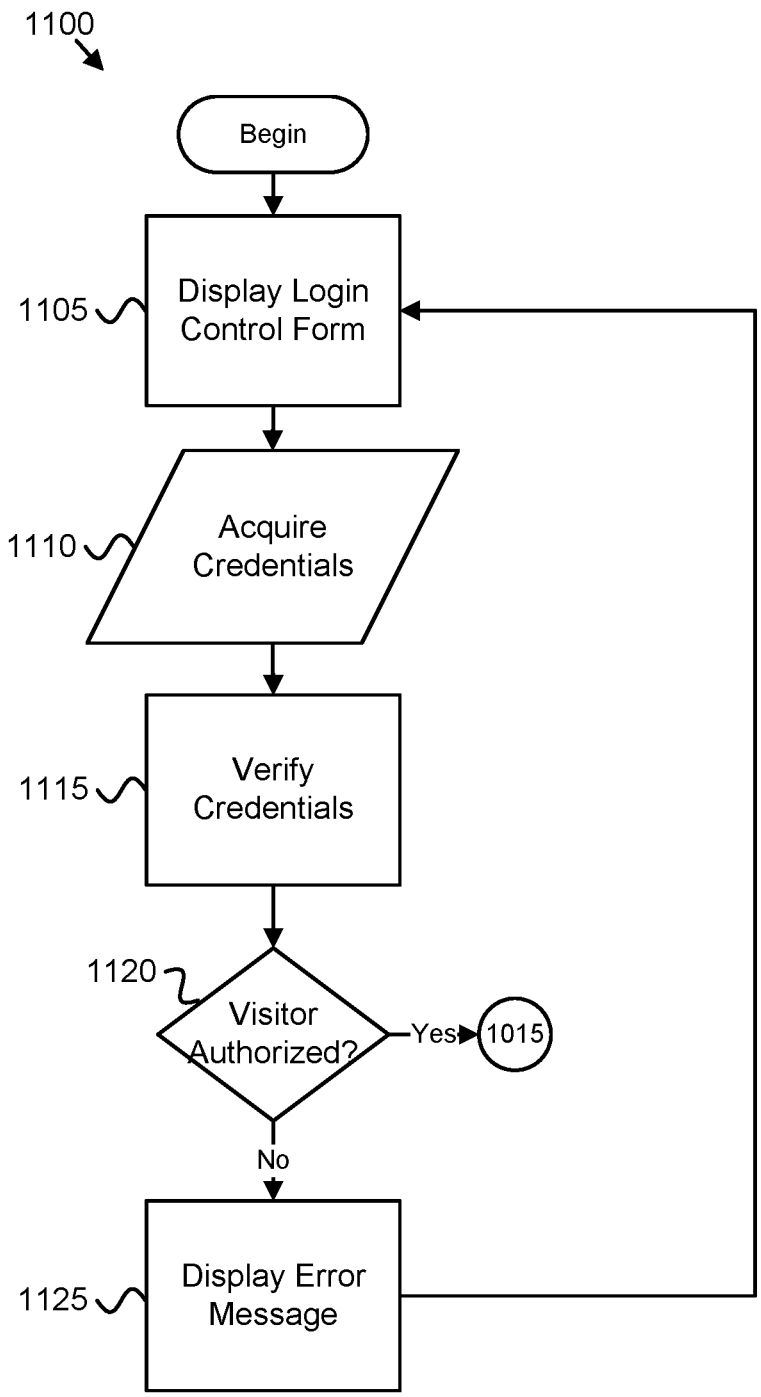
FIG. 11 is a detailed schematic flow chart diagram illustrating one embodiment of a method for a visitor login for a micro commerce ad in accordance with the present subject matter.

FIG. 11 depicts one embodiment of a method 1100 for a visitor login for a micro commerce ad 325. The method 1100 begins and the display module 402 displays 1105 a login control form. In one embodiment, the login control form includes LOGIN and PASSWORD fields and a SUBMIT button link. The receiving module 404 acquires 1110 User's LOGIN and PASSWORD credentials. The login module 420 accesses the database to look up and verify 1115 User's credentials. If the login module 420 determines 1120 that Visitor is not authorized, the panel module 410 displays 1125 an error message and may suggest an additional login attempt and the method returns to step 1105. Alternatively, if the method determines 1120 that the visitor is authorized, the method 1100 may move to step 1015 in FIG. 10.

Figure 12:
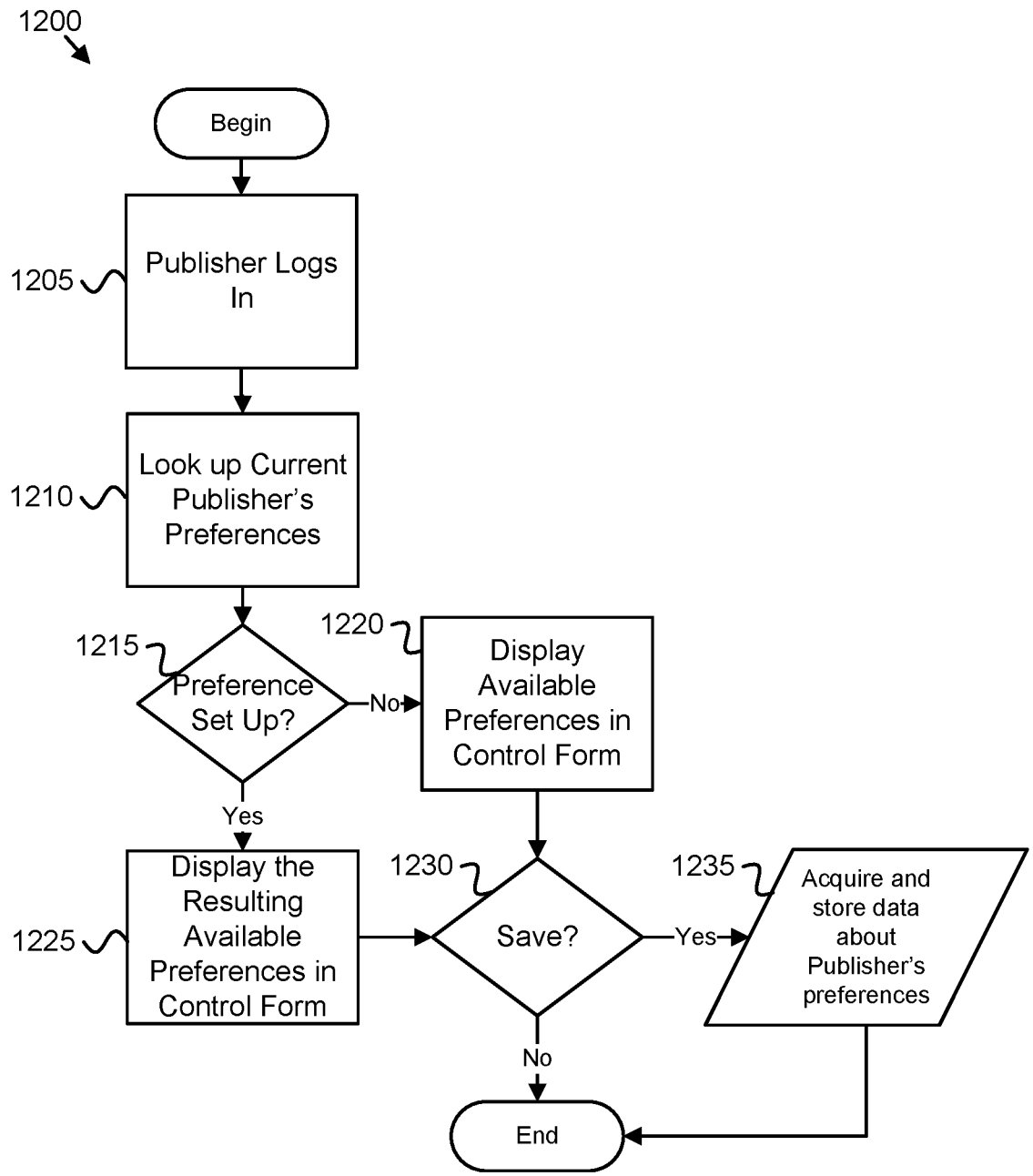
FIG. 12 is a detailed schematic flow chart diagram illustrating one embodiment of method for publisher preferences of a micro commerce ad in accordance with the present subject matter.

FIG. 12 depicts one embodiment of a method 1200 for publisher preferences of a micro commerce ad 325. The method 1200 begins and Publisher logs in 1205 to Advertiser's website. The advertiser server 115 accesses the database to look up 1210 the list of Publisher's current preferences. If the advertiser server 115 determines 1215 that the preferences are setup, the advertiser server 115 displays 1225 the resulting available preferences. In one embodiment, the advertiser server may display the resulting available preferences in a control form filled with Publisher's current preferences along with SAVE and CANCEL button links. Alternatively, the advertiser server 115 displays 1220 available preferences. In one embodiment, the advertiser server displays a control form with the available preferences filled with blanks along with SAVE and CANCEL button links. If the advertiser server 115 detects 1230 the publisher click on SAVE, the advertiser server 115 acquires and stores 1235 data about publisher's preferences and the method 1200 ends. Alternatively, the method 1200 ends.

Figure 13:
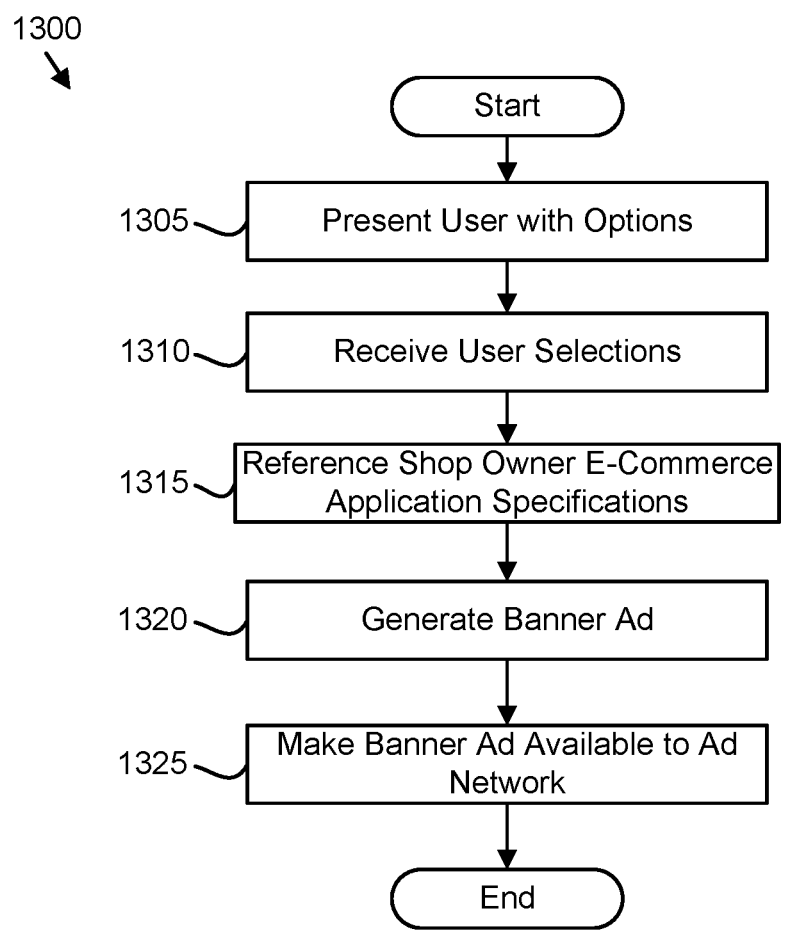
FIG. 13 is a schematic flow chart diagram illustrating one embodiment of a method for a banner ad creation apparatus in accordance with the present subject matter.

FIG. 13 depicts one embodiment of a method 1300 for a banner ad creation apparatus 220. The method 1300 begins and the presentation module 430 presents 1305 a user with one or more customizable options for a banner ad 325. The one or more customizable options may specify banner ad characteristics conforming to banner ad market standards. Next, the selection receiving module 432 receives 1310 one or more user selections associated with at least one of the one or more customizable options. The reference module 446 references 1315 a shop owner e-commerce application 207 specifications. The generating module 434 then generates 1314 the banner ad 325 based on the user selections and based on the specifications such that the banner ad 325 may perform a transaction in the banner ad 325 by communicating directly with the shop owner e-commerce application 207 as described above. The export module 442 may then make 1325 the banner ad 325 available for an ad network server and/or ad exchange. Then the method 1300 ends.

Figure 14A:
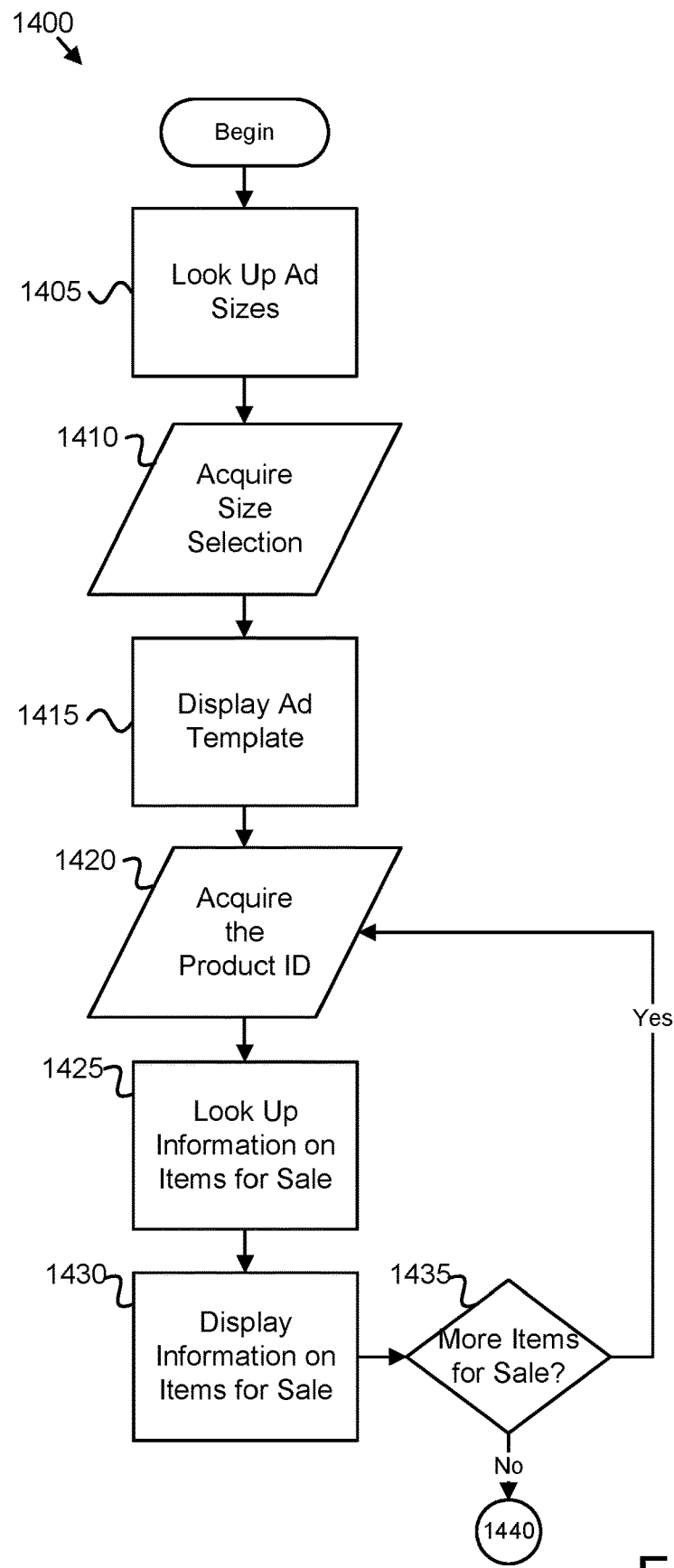
FIG. 14A and FIG. 14B are a detailed schematic flow chart diagram illustrating an embodiment of method for a banner ad creation apparatus in accordance with the present subject matter.
Figure 14B:
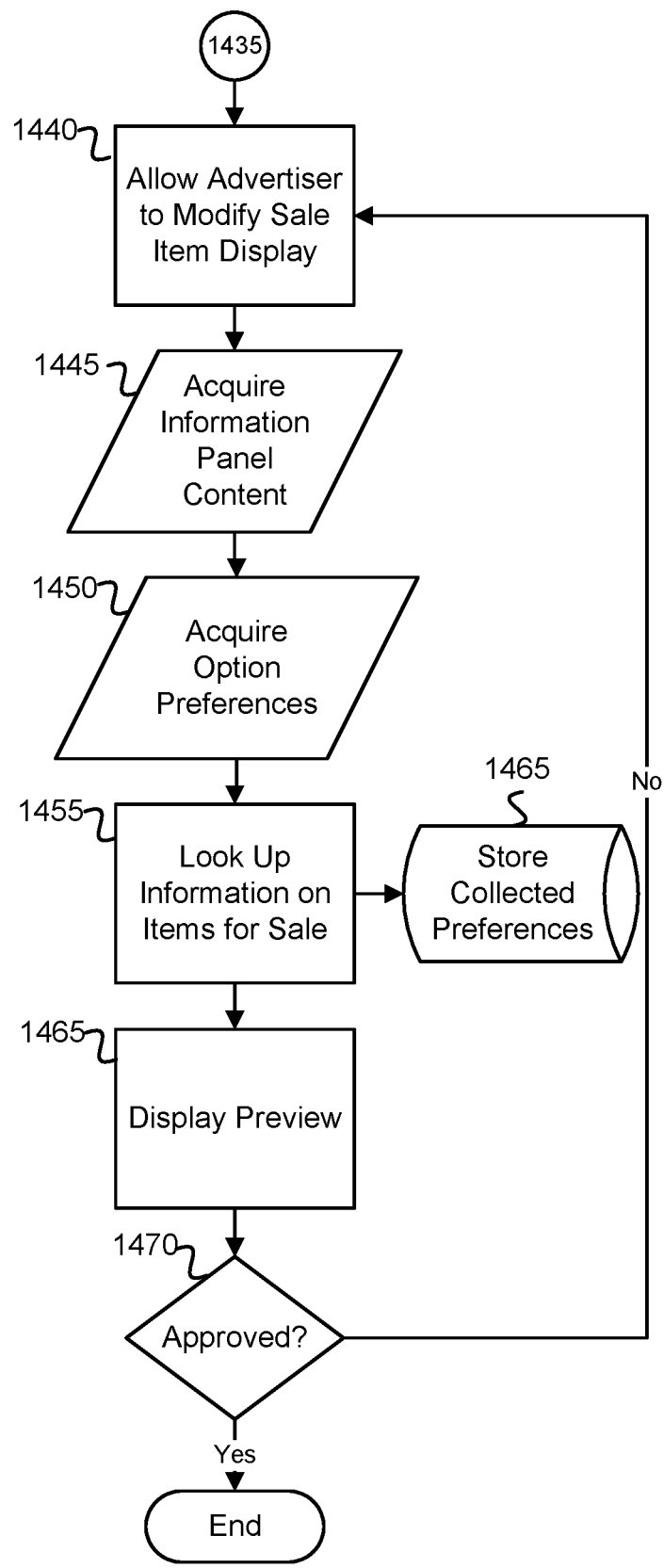

FIGS. 14A and 14B depict one embodiment of a method 1400 for a banner ad creation apparatus 220. The method 1400 begins and the information module 444 looks up 1405 available banner ad sizes. The selection receiving module 432 acquires 1410 the ad size selection and quantity of products to display. The presentation module 430 displays 1415 an ad template with Advertiser's specified ad size and quantity of items for sale. The selection receiving module 432 acquires 1420 the product identifier from Advertiser and the information module 444 looks up 1425 the sale item information including product title, description, and image(s) related to the product identifier. The presentation module 430 displays 1434 the sale item information. If the selection receiving module 432 receives 1435 an indication of more products to display, the method returns to step 1420 to acquire an additional product identifier.

Alternatively, referring to the continuation of the method in FIG. 14B, the presentation module 430 allows 1444 Advertiser to modify the sale item display by, for example, shuffling and changing the display order of the items for sale. Then, the selection receiving module 432 acquires 1445 content from Advertiser for the information panel (e.g. a Help/FAQ panel). Next, the selection receiving module 432 acquires 1450 various option preference settings such as color theme, message contents, logo, and the like. The information module 444 looks up 1455 the product title, description, and image(s) related to the product identifier. Furthermore, the information module 444 may store 1460 collected Advertiser's preferences to database storage for use in later projects. The generating module 434 displays 1465 a preview of the finished ad 325. If the Advertiser does not approve 1470 the ad 325, the method returns to step 1444. Alternatively, the method 1400 ends.

Figure 15A:
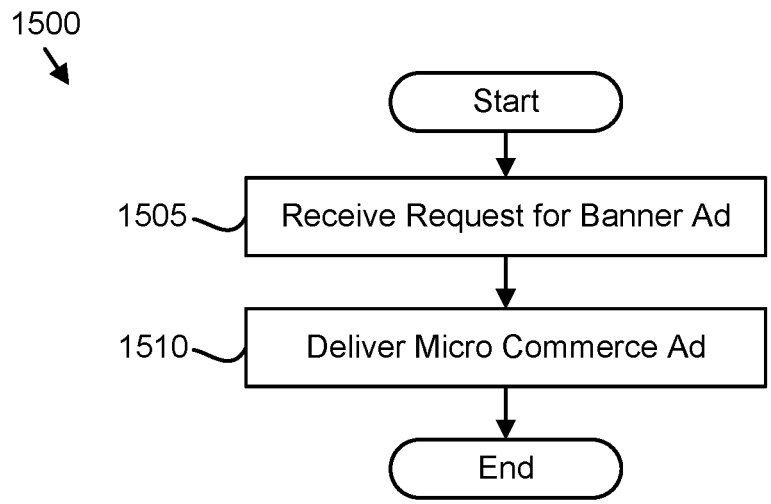
FIG. 15A is a schematic flow chart diagram illustrating one embodiment of a method for delivering a micro commerce ad.

FIG. 15A illustrates one embodiment of a method 1500 for delivering a micro commerce ad 325. The method begins and an ad network server 110 and/or advertiser server 115 receives 1505 a request for a banner ad 325 for display in a banner ad space of a publisher webpage associated with a publisher, the request received according to banner ad market standards. The request is sent by a client 125 that has loaded the webpage and executed the instructions in the webpage configured to make a request for a banner ad. The ad network server 110 and/or advertiser server 115 then delivers 1325 a particular banner ad 325 to the client 125 (e.g. a visitor's browser) in response to receiving the request. The particular banner ad 325 includes characteristics conforming to banner ad 325 market standards. In addition, the particular banner ad 325 is a micro commerce ad 325 as described herein, configured to display an advertisement, receives visitor input, and perform a transaction in the particular banner ad 325. In one embodiment, the particular banner ad 325 communicates directly with a shop owner's e-commerce application 207 to perform the transaction. Furthermore, in one embodiment, the particular banner ad 325, when delivered to the client 125, lacks instructions configured to perform the transaction in the banner ad 325. In this embodiment, the particular banner ad 325 is further configured to detect a user interaction with the particular banner ad 325; and retrieve the instructions in response to detecting the user interaction with the banner ad 325. In this embodiment the particular banner ad 325 performs the transaction in the particular banner ad 325 using the instructions. Then, the method 1500 ends.

Figure 15B:
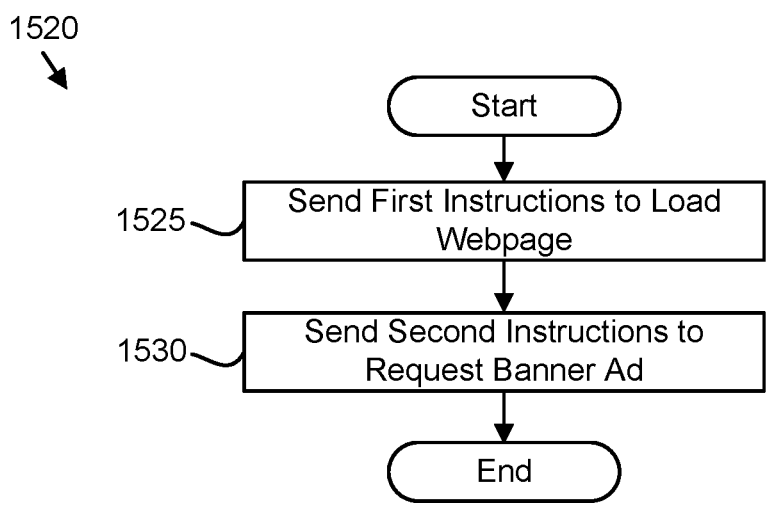
FIG. 15B is a schematic flow chart diagram illustrating one embodiment of a method for receiving a micro commerce ad.

FIG. 15B illustrates one embodiment of a method 1520 for receiving a micro commerce ad 325. The method 1520 begins and the publisher server 105 sends 1525 first instructions to a client 125. The first instructions are configured to load a publisher webpage in the client 125. The publisher webpage includes a banner ad slot for displaying a banner ad. Next, the publisher webpage sends second instructions to the client. The second instructions are configured to cause the client 125 to send a request, from the client, for a banner ad for display in the banner ad slot of the publisher webpage. The first and second instructions may be sent in a common communication (e.g. part of the same webpage or webpage code) or in separate communications. Furthermore, the instructions may include code, executable code, logic, and/or software. The second instructions may include instructions that when executed, directly cause the client 125 to request a banner ad. In other embodiments, the second instructions trigger the client 125 to request additional instructions (e.g. from another server separate from the publisher server 105) that when executed, cause the client to request a banner ad.

The request is sent according to banner ad market standards, and the client may receive a particular banner ad in response to the request. The particular banner ad 325 includes characteristics conforming to banner ad market standards. In addition, the particular banner ad 325 is a micro commerce ad 325 described herein, configured to display an advertisement, receive visitor input, and perform a transaction in the particular banner ad 325. The client 125 then displays 1635 the particular banner ad 325 within the banner ad space. In one embodiment, the particular banner ad 325 communicates directly with a shop owner's e-commerce application 207 to perform the transaction. Furthermore, in one embodiment, the particular banner ad 325, when delivered to the client 125, lacks instructions configured to perform the transaction in the banner ad 325. In this embodiment, the particular banner ad 325 is further configured to detect a user interaction with the particular banner ad 325 and retrieve the instructions in response to detecting the user interaction with the banner ad 325. In this embodiment the particular banner ad 325 performs the transaction in the particular banner ad 325 using the instructions. Then, the method 1520 ends.

Figure 16:
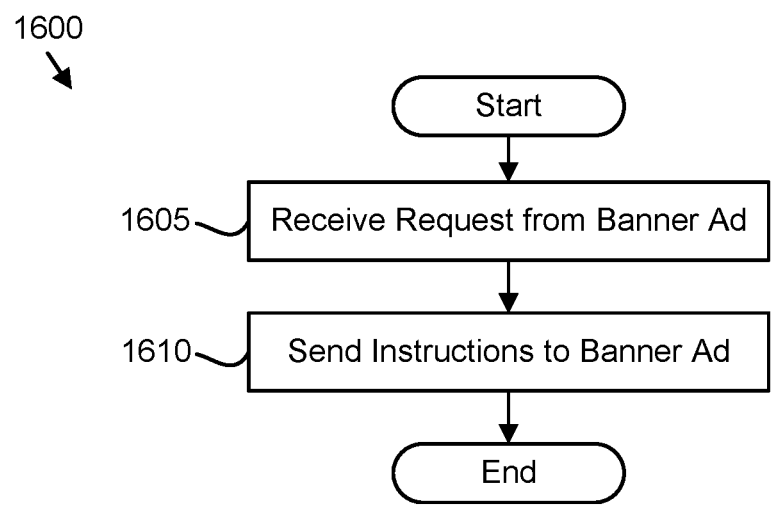
FIG. 16 is a schematic flow chart diagram illustrating one embodiment of a method for sending instructions to a micro commerce ad in accordance with the present subject matter.

FIG. 16 depicts one embodiment of a method 1700 for a micro commerce ad 325 using a shop owner e-commerce application 207. The method 1700 begins and the instructions module 450 receives 1605 a request from a banner ad 325. The request may request instructions configured to perform a transaction in the banner ad 325. The banner ad 325 is a micro commerce ad 325 as described herein, configured to display an advertisement and including characteristics conforming to banner ad market standards. The banner ad 325 may be displayed in a banner ad slot of a publisher webpage. In one embodiment, the banner ad 325, when received by a client 125 for display within the banner ad slot and prior to detecting the visitor interaction, lacks the instructions configured to perform the transaction within the banner ad 325.

The instructions module 450 sends 1610 the instructions to the banner ad 325. As described above, the banner ad 325 may be configured to receive visitor input in the banner ad 325 from a visitor and perform the transaction, using the instructions, in the banner ad 325 to process the visitor input. Then the method 1600 ends.

Figure 17:
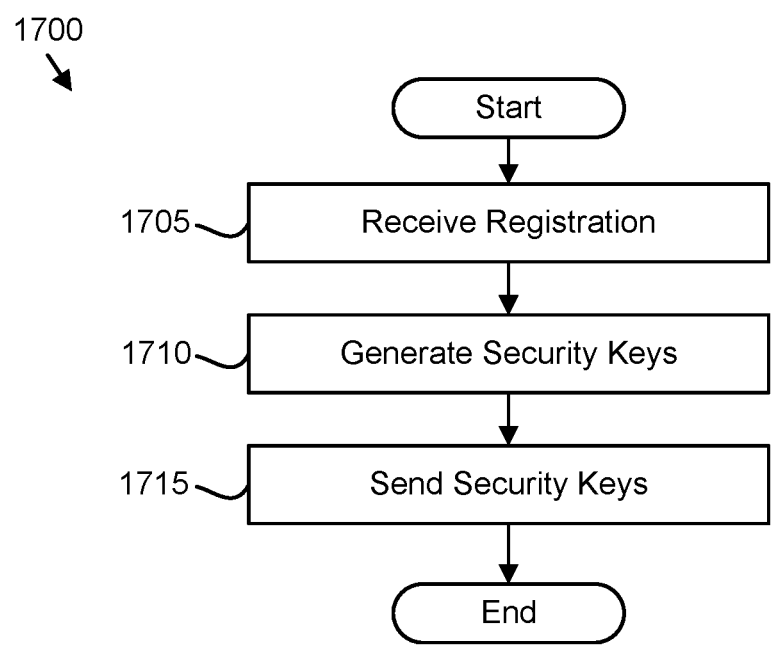
FIG. 17 is a schematic flow chart diagram illustrating one embodiment of a method for generating a security keys in accordance with the present subject matter.

FIG. 17 depicts one embodiment of a method 1700 for generating a security key for a micro-commerce ad 325. The method 1700 begins and user account module 454 receives 1705 a user registration from a shop owner associated with a shop owner e-commerce application 207. The user account module 454 may provide an account for the shop owner who may register with a user name and password. The key generation module 456 generates 1325 one or more security keys to facilitate secure communication between the banner ad 325 and the shop owner e-commerce application 207. The key generation module 456, in one embodiment, generates variable identifiers for use in the security key. For example, the key generation module 456 may generate a random shopping cart unique ID to uniquely identify a particular shopping cart of the shop owner.

In certain embodiments, the shop owner installs the ad communication apparatus 211 to the shop owner e-commerce application 207 (e.g. as a plug-in). The ad communication apparatus 211 may include a vendor version string. The ad communication apparatus 211 may query the shop owner for the username and shopping cart unique ID. The ad communication apparatus 211 may communicate with the micro commerce ad provider server 117 to verify any variable identifiers such as the username and the shopping cart unique ID. In one embodiment, the ad communication apparatus 211 provides the vendor version string such that the micro commerce ad provider server 117 is aware of what plug-in is being used. The key communication module 458 then sends 1715 the one or more security keys to the shop owner e-commerce application 207 (e.g. the ad communication apparatus 211). In certain embodiments, the key communication module 458 also provides and/or sends one or more of the security keys to the banner ad creation apparatus 220, which may generate the banner ad with one or more of the security keys. Then the method 1700 ends.

The present subject matter may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus, comprising:
a processor;
a memory that stores code executable by the processor to:
display an advertisement of a third-party advertiser, within an interface of an application that is not created and owned by the third-party advertiser, and that is presented on a display of a user's device, the advertisement, received from an ad server, comprising an offering for one or more of a product and a service presented to a visitor of the interface, the offering receivable by the visitor in response to the visitor providing input within the advertisement on the user's device;
receive, at a server device for the application, the input from one or more input fields presented within the advertisement for receiving the offering;
provide the offering to the visitor within the advertisement presented on the display of the user's device as part of a transaction in response to receiving the input from the visitor in the advertisement presented within the application without redirecting the visitor away from the application and to a different interface associated with the third-party advertiser to complete the transaction;
in response to determining that the offering is an initial offering provided to the visitor, receive visitor information at the server device for the application for the visitor to register the visitor with the application without storing the visitor information at a data store of the third-party advertiser; and
facilitate completing the transaction for the offering by retrieving stored visitor information from the server device for the application and using the stored visitor information for finalizing the transaction within the advertisement.

2. The apparatus of claim 1, wherein the input comprises contact information and preference information for one or more products and services.

3. The apparatus of claim 2, wherein the preference information comprises visitor input associated with a selection of one or more products and services that the visitor prefers.

4. The apparatus of claim 3, wherein the visitor input comprises a selection of one or more categories and sub-categories of products and services.

5. The apparatus of claim 4, wherein the one or more of products and services are associated with the third-party advertiser for the advertisement and are selected according to products and services that are available from the third-party advertiser, the visitor selecting the one or more categories and sub-categories of the products and services from within the advertisement.

6. The apparatus of claim 5, wherein the selected categories and sub-categories of products and services are selected on the third-party advertiser's website and stored in a visitor account associated with the third-party advertiser.

7. The apparatus of claim 6, wherein the visitor logs into the visitor account by providing credentials within the advertisement to access the visitor's preferences.

8. The apparatus of claim 4, wherein the visitor registers for a new visitor account within the advertisement, the visitor's selection of one or more categories and sub-categories of products and services associated with the visitor's account.

9. The apparatus of claim 8, wherein the offering for the one or more of the product and the service presented to the visitor is selected based on previously stored preferences associated with the visitor's account.

10. The apparatus of claim 9, wherein the previously stored preferences are based on a purchase history of the visitor at the third-party advertiser.

11. The apparatus of claim 9, wherein the previously stored preferences are stored in a database and accessed based on a visitor identifier.

12. The apparatus of claim 1, wherein the code is further executable by the processor to: receive real-time information from the third-party advertiser for the offering for the one or more of the product and the service; and dynamically update the advertisement information for the one or more of the product and the service based on the received information.

13. The apparatus of claim 12, wherein the real-time information comprises price information, inventory information, description information, quantity information, and payment information.

14. The apparatus of claim 1, wherein the advertisement further comprises a plurality of different panels, each panel representing a distinct display within the banner ad, the plurality of panels comprising one or more of storefront panels, settings panels, sales information panels, and visitor registration panels, the visitor setting preferences within the settings panel.

15. A method, comprising:
displaying an advertisement of a third-party advertiser, within an interface of an application that is not created and owned by the third-party advertiser, and that is presented on a display of a user's device, the advertisement, received from an ad server, comprising an offering for one or more of a product and a service presented to a visitor of the interface, the offering receivable by the visitor in response to the visitor providing input within the advertisement on the user's device;
receiving, at a server device for the application, the input from one or more input fields presented within the advertisement for receiving the offering;
providing the offering to the visitor within the advertisement presented on the display of the user's device as part of a transaction in response to receiving the input from the visitor in the advertisement presented within the application without redirecting the visitor away from the application and to a different interface associated with the third-party advertiser to complete the transaction;
in response to determining that the offering is an initial offering provided to the visitor, receiving visitor information at the server device for the application for the visitor to register the visitor with the application without storing the visitor information at a data store of the third-party advertiser; and
facilitating completing the transaction for the offering by retrieving stored visitor information from the server device for the application and using the stored visitor information for finalizing the transaction within the advertisement.

16. The method of claim 15, wherein the input comprises contact information and preference information for one or more products and services, the preference information comprising visitor input associated with a selection of one or more products and services that the visitor prefers, the visitor input comprising a selection of one or more categories and sub-categories of products and services.

17. The method of claim 16, wherein the one or more of products and services are associated with the third-party advertiser for the advertisement and are selected according to products and services that are available from the third-party advertiser, the visitor selecting the one or more categories and sub-categories of the products and services from within the advertisement.

18. The method of claim 17, wherein the selected categories and sub-categories of products and services are selected on the third-party advertiser's website and stored in a visitor account, the visitor logging into the visitor account by providing credentials within the advertisement to access the visitor's preferences.

19. The method of claim 16, wherein the visitor registers for a new visitor account with the third-party advertiser from within the advertisement, the visitor's selection of one or more categories and sub-categories of products and services associated with the visitor's account.

20. A computer program product comprising a computer readable storage medium storing computer usable program code executable to perform operations comprising:
displaying an advertisement of a third-party advertiser, within an interface of an application that is not created and owned by the third-party advertiser, and that is presented on a display of a user's device, the advertisement, received from an ad server, comprising an offering for one or more of a product and a service presented to a visitor of the interface, the offering receivable by the visitor in response to the visitor providing input within the advertisement on the user's device;
receiving, at a server device for the application, the input from one or more input fields presented within the advertisement for receiving the offering;
providing the offering to the visitor within the advertisement presented on the display of the user's device as part of a transaction in response to receiving the input from the visitor in the advertisement presented within the application without redirecting the visitor away from the application and to a different interface associated with the third-party advertiser to complete the transaction;
in response to determining that the offering is an initial offering provided to the visitor, receive visitor information at the server device for the application for the visitor to register the visitor with the application without storing the visitor information at a data store of the third-party advertiser; and
facilitating completing the transaction for the offering by retrieving stored visitor information from the server device for the application and using the stored visitor information for finalizing the transaction within the advertisement.

* * * * *